United States Patent
Aronkytö

(10) Patent No.: US 12,028,846 B2
(45) Date of Patent: Jul. 2, 2024

(54) TIME SYNCHRONIZATION USING MARKERS

(71) Applicant: NOKIA TECHNOLOGIES OY, Espoo (FI)

(72) Inventor: Kimmo Kaleva Aronkytö, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/080,458

(22) Filed: Dec. 13, 2022

(65) Prior Publication Data

US 2023/0189242 A1 Jun. 15, 2023

(30) Foreign Application Priority Data

Dec. 14, 2021 (FI) ..................................... 20216271

(51) Int. Cl.
*H04W 72/044* (2023.01)
*H04W 72/1273* (2023.01)
*H04W 72/541* (2023.01)

(52) U.S. Cl.
CPC ... *H04W 72/0473* (2013.01); *H04W 72/1273* (2013.01); *H04W 72/541* (2023.01)

(58) Field of Classification Search
CPC ........... H04W 72/0473; H04W 72/541; H04W 72/1273
See application file for complete search history.

(56) References Cited

U.S. PATENT DOCUMENTS

2008/0292039 A1* 11/2008 Vossiek ..................... G01S 5/06
375/358
2015/0317273 A1* 11/2015 Errickson ............... G06F 15/17
709/248

(Continued)

FOREIGN PATENT DOCUMENTS

CN 101689925 A 3/2010
CN 103004266 A 3/2013

(Continued)

OTHER PUBLICATIONS

Communication of Acceptance—section 29a of Patents Decree dated Apr. 22, 2022 corresponding to Finnish Patent No. 20216271.

(Continued)

*Primary Examiner* — Jasper Kwoh
(74) *Attorney, Agent, or Firm* — SQUIRE PATTON BOGGS (US) LLP

(57) ABSTRACT

An apparatus comprises a sampling circuit configured to sample transmit and receive signals of a first radio node to be transmitted to or received from a second radio node. Transmit-side and receive-side envelope detectors are configured to produce transmit-side and receive-side envelope signals based on sampled transmit and receive signals. A transmit-side time measurement unit is configured to generate, based on the transmit-side envelope signal, a transmit-side marker signal based on a pre-defined transmit-side threshold, measure at least one first time delay between at least one time start pulse and at least one marker of the transmit-side marker signal and store to a memory and/or output said at least one first time delay. A receive-side time measurement unit is configured to implement the corresponding functionalities as described for the transmit-side time measurement unit in the receive-side.

22 Claims, 11 Drawing Sheets

(56) References Cited

U.S. PATENT DOCUMENTS

| | | |
|---|---|---|
| 2018/0132199 A1 | 5/2018 | Zhang et al. |
| 2019/0356466 A1 | 11/2019 | Kratz et al. |
| 2020/0153517 A1 | 5/2020 | Akkarakaran et al. |
| 2020/0382233 A1 | 12/2020 | Oe et al. |
| 2021/0345270 A1 | 11/2021 | Murali et al. |
| 2022/0095343 A1* | 3/2022 | Khoshnevisan ...... H04W 24/08 |
| 2023/0028423 A1* | 1/2023 | Xu ................. H04B 7/0663 |

FOREIGN PATENT DOCUMENTS

| | | |
|---|---|---|
| CN | 110932931 A | 3/2020 |
| CN | 111106894 A | 5/2020 |
| CN | 113302595 A | 8/2021 |
| EP | 1 217 779 A1 | 6/2002 |
| EP | 1217779 A1 | 6/2002 |
| EP | 3863191 A1 | 8/2021 |
| JP | 2011-112428 A | 6/2011 |
| WO | 2016/181198 A1 | 11/2016 |

OTHER PUBLICATIONS

Finnish Search Report dated Apr. 22, 2022 corresponding to Finnish Patent Application No. 20216271.
Extended European Search Report corresponding to EP Application No. 22209623.2, dated Apr. 25, 2023.
Office Action and Search Report dated Oct. 25, 2023, corresponding to Chinese Patent Application No. 202211627988.5.

\* cited by examiner

TIME SYNCHRONIZATION USING MARKERS

CROSS REFERENCE TO RELATED APPLICATION

This application claims the benefit of Finnish Application No. 20216271, filed Dec. 14, 2021. The entire content of the above-referenced application is hereby incorporated by reference.

TECHNICAL FIELD

Various example embodiments relate to wireless communications.

BACKGROUND

Time synchronization has an important role in many communication networks. Current communication networks typically use either Network Time Protocol (NTP) or Precision Time Protocol (PTP) to synchronize their clocks. NTP and PTP are both packet-based network protocols, which exchange time stamps between nodes to derive the synchronization. Although NTP and PTP are relatively similar protocols, their implementation makes the accuracy of PTP higher compared to NTP. Typically, accuracy of NTP is in milliseconds while accuracy of PTP is in microseconds.

One disadvantage in the standard packet-based time synchronizations, like NTP or PTP, is that they require a heavy network infrastructure, with clocks, servers and clients, to work. Another disadvantageous characteristic of NTP or PTP in particular is that the uplink and downlink delays between nodes may not always be equal, which results in inaccuracy in the time synchronization. Also, their processing delays can be high because of the use of the high protocol layer, which makes the synchronization inaccurate too.

BRIEF DESCRIPTION

According to an aspect, there is provided the subject matter of the independent claims. Embodiments are defined in the dependent claims. The scope of protection sought for various embodiments is set out by the independent claims.

The embodiments and features, if any, described in this specification that do not fall under the scope of the independent claims are to be interpreted as examples useful for understanding various embodiments.

BRIEF DESCRIPTION OF DRAWINGS

In the following, example embodiments will be described in greater detail with reference to the attached drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The expression "communicatively connected" as used in the following may have the meaning of connected so as to enable communication (i.e., transmission and/or reception of signals) between the connected elements. Elements which are communicatively connected may be connected, for example, via one or more wired communication links, one or more wireless communication links, one or more wired communication networks and/or one or more wireless communication networks. The expression "communicatively connected" does not necessarily imply that the associated elements are electrically connected (i.e., connected via a conducting path) and/or physically connected.

Figure 1:
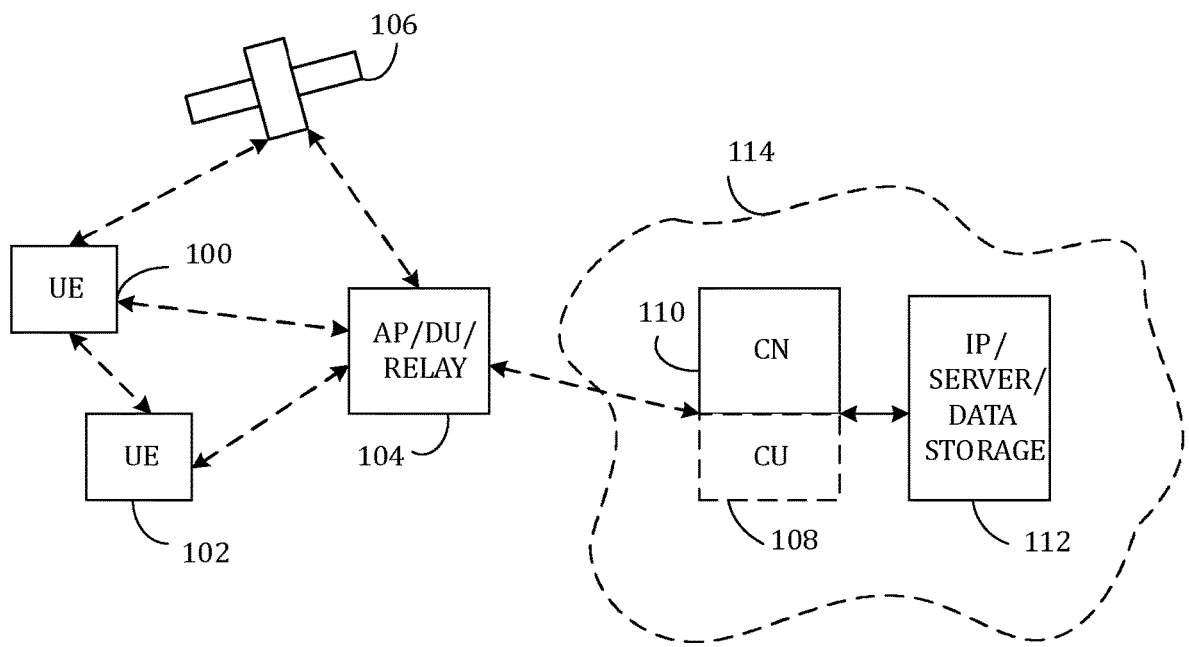
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 may, for example, be user devices. The devices 100 and 102 are configured to be in a wireless connection on one or more communication channels with a node 104. The node 104 is further connected to a core network 110. In one example, the node 104 may be an access node such as (e/g)NodeB providing or serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 110 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g., to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Time synchronization has an important role in many communication networks and systems such as in the system of FIG. 1. Typically, either Network Time Protocol (NTP) or Precision Time Protocol (PTP) is used for clock synchronization. NTP and PTP are both packet-based network protocols, which exchange time stamps between nodes to derive the synchronization. Although NTP and PTP are relatively similar protocols, their implementation makes the accuracy of PTP higher compared to NTP. Typically, accuracy of NTP is in milliseconds while accuracy of PTP is in microseconds.

One disadvantage in the standard packet-based time synchronizations, like NTP or PTP, is that they require a heavy network infrastructure, with clocks, servers and clients, to work. Another disadvantageous characteristic of NTP or PTP in particular is that the uplink and downlink delays between nodes may not always be equal, which results in inaccuracy in the time synchronization. Also, their processing delays can be high because of the use of the high protocol layer, which makes the synchronization inaccurate as well.

The embodiments to be discussed below seek to overcome the aforementioned problems by providing an apparatus and a method for time measurements and time synchronization based on said time measurements which takes advantage of the equal delays introduced by a given radio path (i.e., a given propagation channel) in the two opposite directions. As such time measurements takes place in the physical layer, the processing delays are small.

The embodiments enable improving the accuracy of the existing solutions, such as NTP or PTP based synchronization, or alternatively enable synchronization of stand-alone clocks. The improvement ratio depends on the current synchronization level and the used circuitry, but a nanosecond level synchronization is very feasible.

The purpose of the embodiments is to improve or create time synchronization in networks, which include a point-to-point, line-of-sight, wireless communication link, like a mm-wave radio hop. The method uses certain points in the modulation envelope signal to act as time markers (equally called envelope markers or just markers). By measuring time differences between a marker and a system clock for transmitted and received signals in a radio node and exchanging this information over network with another radio node, a relative synchronization between the two radio nodes is obtained.

Modulation envelope is instantaneous amplitude of the RF transmission over time and can be detected with a simple way, by just a detector. It is pseudorandom signal like modulation itself, and in direct path radio hops it is equal in the transmission and reception, but, naturally, delayed due to path length.

Figure 2:
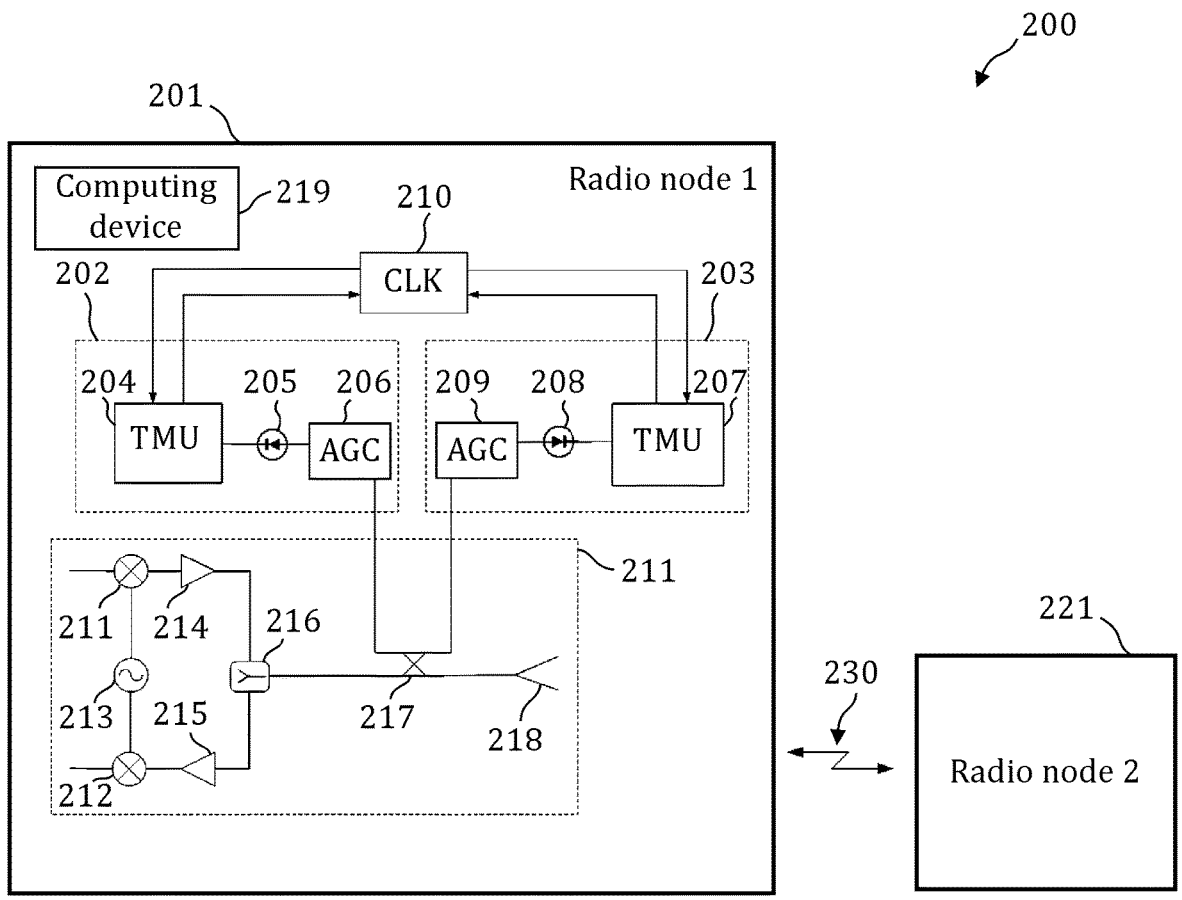
FIG. 2 illustrates a system according to embodiments.

FIG. 2 illustrates a system 200 according to embodiments. Said system 200 may form a part of the communication system of FIG. 1. Namely, each of the first and second radio units 201, 221 may correspond to any of terminal devices 100, 102 or the access/relay node/distributed unit 104 of FIG. 1.

Referring to FIG. 2, the system 200 comprises a first radio node 201 and a second radio node 221. The first and second radio nodes 201, 221 may be, for example, terminal devices, access nodes, relay nodes or parts thereof. A wireless connection 230 over a propagation channel (or a radio hop) is provided between the first and second radio nodes 201, 221. While only the first radio node 201 is illustrated in detail in FIG. 1, the first and second radio nodes 201, 211 may have substantially the same architecture (at least when it comes to the elements relevant for the embodiments). Thus, the operation to be discussed below in detail for the first radio node 201 applies, mutatis mutandis, also for the second radio node 211.

The first radio node 201 may comprise a typical radio transceiver with some additional elements 202 to 209, 217 for enabling performing of time measurements with the second radio node 221. The purpose of said additional elements 202 to 209, 217 is to enable synchronization between a clock 210 (CLK) of the first radio node 201 and a corresponding clock of the second radio node 221.

The first radio node 201 comprises a radio unit 211. Apart from the inclusion of the directional coupler 217, the radio unit 211 may correspond to any conventional radio unit. In the illustrated example, the radio unit 211 comprises at least one antenna 218 for receiving signals from and transmitting signals to the second radio node 221 via the wireless connection 230. The at least one antenna 218 is connected electrically to a (RF) duplexer 216 which serves to isolate the transmitter and receiver parts (i.e., top and bottom branches in FIG. 2) of the first radio node 201. A duplexer 216 may be employed specifically in frequency division duplex (FDD) systems. A switch may be employed, instead of the duplexer 216, in time division duplex (TDD) systems. The transmitter part of the first radio node comprises at least a first RF mixer 211 for producing a radio frequency signal for transmission and a power amplifier 214 for amplifying said radio frequency signal. The receiver part comprises at least a low-noise amplifier 215 for amplifying a radio frequency signal received via the at least one antenna 218 and the duplexer 216 and a second RF mixer 212 for producing an intermediate frequency (IF) signal for further reception stages. Both of the first and second mixers 211, 212 may employ the same local oscillator signal produced by the local oscillator 213 for the mixing operations.

It should be noted that FIG. 2 shows only a simplified view of the radio unit 211. In practice, the radio unit 211 may comprise further conventional (superheterodyne) transceiver processing stages implementing, for example, intermediate frequency processing, digital-to-analog and/or analog-to-digital conversion and/or baseband processing. The exact operation of the radio unit 211 (especially in regard to IF and/or baseband processing) is not of importance in view of the embodiments.

The first radio node 201 further comprises a clock 210 (equally called a node clock). The clock 210 may be either an existing clock of the first radio node or radio node or an additional clock provided in addition to the basic clock of the first radio node 201. The clock 210 provides or outputs a time signal (equally called a time start pulse a time start pulse signal).

The time start pulse signal provided by the clock 210 is used as a reference to which transmit-side and receive-side (time) marker signals generated by the transmit-side and receive-side measurement units are compared (see discussion below for further details). Time start pulses in the time start pulse signal are given in certain pre-defined time steps, e.g., once a millisecond, depending on the time synchronization system implementation and its requirements. The rate of the pulses in the first and second radio node 201, 221 is equal. One straight-forward way of generating time start pulses is dividing the clock frequency of the clock 210 with a certain constant. Important for the concept is, that both the first and second radio node 201, 221 generate the time start pulses at equal delay from their respective clocks 210 to keep the time measurement accurate. The length of this delay is not important as delay terms cancel each other in the time calculation.

As mentioned above, the radio unit 211 comprises a directional coupler 217 (or other sampling circuitry such as a power splitter or a power divider) configured to sample transmit and receive signals of the first radio node to be transmitted to or received from a second radio node. As shown in FIG. 2, said transmit and receive signals may be RF signals. In other embodiments, said sampled transmit and receive signals may be IF signals. In either case, the sampled transmit and receive are fed to the transmit-side (Tx) and receive-side (Rx) measurement units 203, 202, respectively.

The receive-side and transmit-side measurement units 202, 203 may have the same architecture. Namely, the receive-side and transmit-side measurement units 202, 203 comprise, respectively, receive-side and transmit-side automatic gain control (AGC) units 206, 209, receive-side and transmit-side envelope detectors 205, 208 and receive-side and transmit-side time measurement units (TMUs) 204, 207. However, the specific configuration of at least some of the elements (namely, the automatic gain control units 206, 209) may differ. In the following, only the operation of the transmit-side measurement unit 202 is discussed in detail for brevity. Said discussion applies, mutatis mutandis, for the receive-side measurement unit 203, unless otherwise explicitly stated.

The transmit-side AGC unit 209 is configured to (dynamically) adjust power level of the sampled transmit signal. The sampled transmit-side signal following said adjustment is fed to the transmit-side envelope detector 208.

Similarly, the receive-side AGC unit 206 is configured to (dynamically) adjust power level of the sampled receive signal and to feed the sampled receive-side signal following said adjustment to the receive-side envelope detector 205. However, as mentioned above, the configuration of the receive-side AGC unit 206 may differ from the configuration of the transmit-side AGC unit 209 due to the fact that the power level of the sampled receive signal depends has a much lower power level which is also heavily dependent on the propagation channel (i.e., on the radio hop). The receive-side AGC unit 206 may be specifically used for compensating for the pathloss resulting from the propagation channel (i.e., from the radio hop).

The receive-side and transmit-side AGC units 206, 209 may be set to give, at least approximately or substantially, the same power level for the envelope detector in the receive-side and transmit-side measurement units 202, 203. The power (or amplitude) levels do not need to be exactly equal, because the time markers are created from the envelope amplitude in a relative way, which allows for changes in their levels. Specifically, the level of envelope amplitude may be measured separately in the receive-side and transmit-side measurement units 202, 203 and thresholds for creating a marker in the receive-side and transmit-side measurement units 202, 203 may be set separately based on these measurements.

In some embodiments, one or both of the receive-side and transmit-side AGC units 206, 209 may be omitted. If said element(s) 206, 209 are omitted, the receive and/or transmit-side time measurement units 204, 207 may be configured to take into account the possibly changing amplitude levels in the value of the transmit-side/receive-side thresholds for defining markers.

The transmit-side envelope detector 208 is configured at least to produce a transmit-side envelope signal based on the sampled (and gain-controlled) transmit signal. The transmit-side envelope detector 208 may be configured to have a high enough bandwidth to be able follow the signal level changes due to modulation in the sampled transmit signal. For example, the bandwidth of the transmit-side envelope detector 208 may be substantially equal to the modulation bandwidth.

The transmit-side time measurement unit 207 is configured to generate, based on the transmit-side envelope signal, a transmit-side marker signal (equally called a transmit-side envelope marker signal or a transmit-side time marker signal). The transmit-side marker signal may be a digital signal. The transmit-side marker signal may be generated, e.g., by assigning a first value (e.g., 1 or other non-zero value) for one or more sections (or equally one or more time sections or time segments) of the transmit-side envelope signal exceeding (or alternatively falling below) a pre-defined transmit-side threshold for defining one or more markers and assigning a different value (e.g., 0) for (all) other sections of the transmit-side envelope signal. In other words, the sections of the transmit-side envelope signal exceeding (or falling below) the pre-defined transmit-side threshold are used as markers. The pre-defined transmit-side threshold may be adjustable. The generation of the transmit-side marker signal may be performed, for example, by a comparator. The receive-side time measurement unit 204 is configured to generate, based on the receive-side envelope signal, a receive-side marker signal (equally called a receive-side envelope marker signal) in a similar manner.

The pre-defined transmit-side threshold and the corresponding pre-defined receive-side threshold may be set to be equal relative to the respective transmit-side or receive-side envelope signal in both the first and second radio nodes 201, 221. This may be done, for example, by measuring the average level of the transmit-side/receive-side envelope signal and setting the (pre-defined) transmit-side/receive-side threshold relative to said average level (e.g., as $nA_{avg}$, where $A_{avg}$ is the average level and n is a pre-defined real-valued coefficient larger than zero). In addition, the transmit-side/receive-side threshold may be further set to fulfil statistical requirements for the marker generation, as will be discussed in detail below, e.g., in connection with FIG. 6A.

The transmit-side time measurement unit 207 is further configured to measure at least one first time delay between at least one time start pulse of the clock 210 of the first radio node 201 and at least one marker of the transmit-side marker signals.

Correspondingly, the receive-side time measurement unit 204 is further configured to measure at least one second time delay between at least one time start pulse of the clock 210 of the first radio node 201 and at least one marker of the receive-side marker signals.

The transmit-side time measurement unit 207 may be further configured to output the at least one first time delay. For example, the at least one first time delay may be outputted to the computing device 219 of the first radio node 201. The computing device 219 may store the at least one first time delay to a memory upon receiving said at least one first time delay. Additionally or alternatively, the transmit-side time measurement unit 207 may store (or cause storing) the at least one first time delay to a memory (i.e., to a memory internal or external to the transmit-side time measurement unit 207). Corresponding functionality or functionalities as described in this paragraph may be implemented at the receive-side time measurement unit 204 for the at least one second time delay.

An exemplary implementation of the transmit-side time measurement unit 207 based on the use of a transmit-side clock (different from the clock 210) and a transmit-side pulse counter is discussed in detail below in connection with FIGS. 3A and 3B. Said Figures may equally illustrate the receive-side time measurement unit 204.

Alternatively, the transmit-side and/or receive-side time measurement unit 207, 204 may be implemented, for example, using one or more (commercial) time-to-digital converters (TDCs). In other words, the transmit-side and/or receive-side time measurement unit 207, 204 may each comprise (or consist of) one or more TDCs. A TDC is a device for recognizing events and providing a digital representation of the time they occurred. TD Cs are commonly used for determining the time interval between two signal pulses (known as start and stop pulse). Thus, a TDC may be used, in some embodiments, for determining the first and second time delays (or equally the third and fourth time delays) between a time start pulse and markers of transmit-side and receive-side marker signals, respectively. In such embodiments, a comparator (such as the comparator 301 to be discussed below in detail) may be used for generating the transmit-side/receive-side marker signal based on the transmit-side/receive-side envelope signal and a pre-defined threshold. The discussion provided below in connection with elements 301, 302 may apply here mutatis mutandis.

As mentioned above, the second radio node 221 may be configured to operate in similar manner as the first radio node 201. Thus, the second radio node 221 is configured to measure at least one third time delay between at least one time start pulse signal of a clock of the second radio node 211 and at least one marker of the transmit-side marker signal generated by the second radio node 211 and measure at least one fourth time delay between the at least one time start pulse of the clock of the second radio node 211 and at least one marker of the receive-side marker signals generated by the second radio node 211.

The second radio node 221 may be configured to transmit information on the one or more third time delays and the one or more fourth time delays to the first radio node 201. Similarly, the first radio node 201 may be configured to transmit information on the one or more first time delays and the one or more second time delays to the first radio node 201.

The first radio unit 201 may further comprise a computing device or a (central) processing unit or circuitry 219. While not shown explicitly shown in FIG. 2, the computing device 219 may be electrically (or communicatively) connected at least to the clock 210 for enabling time adjustments (e.g., clock synchronization and correction) and to the receive-side and transmit-side time measurement units 204, 207. The computing device 219 may be a central computing device or a central processing unit of the first radio node 201 (i.e., it may be configured to carry out typical radio node processing functionalities not directly related to the embodiments) or a separate (dedicated) computing device 219 for carrying out (only) the functionalities described in connection with embodiments. An implementation of the computing device 219 is discussed in more detail in connection with FIG. 8.

In some embodiments, the computing device 219 may form a part of one of the receive-side and transmit-side time measurement units 204, 207.

The computing device 219 may be configured to calculate a time difference between the first radio node 201 and the second radio node 221 based on the one or more first and second time delays measured, respectively, by the transmit-side and receive-side measurement units 203, 202 and corresponding one or more third and fourth time markers measured by the second radio node 221 and received from it (directly or via another device or devices). The computing device 219 may be further configured to correct synchronization of the clock 210 or to synchronize the clock 210 based on the time difference. This functionality is discussed in more detail in connection with FIG. 4.

Figure 3A:
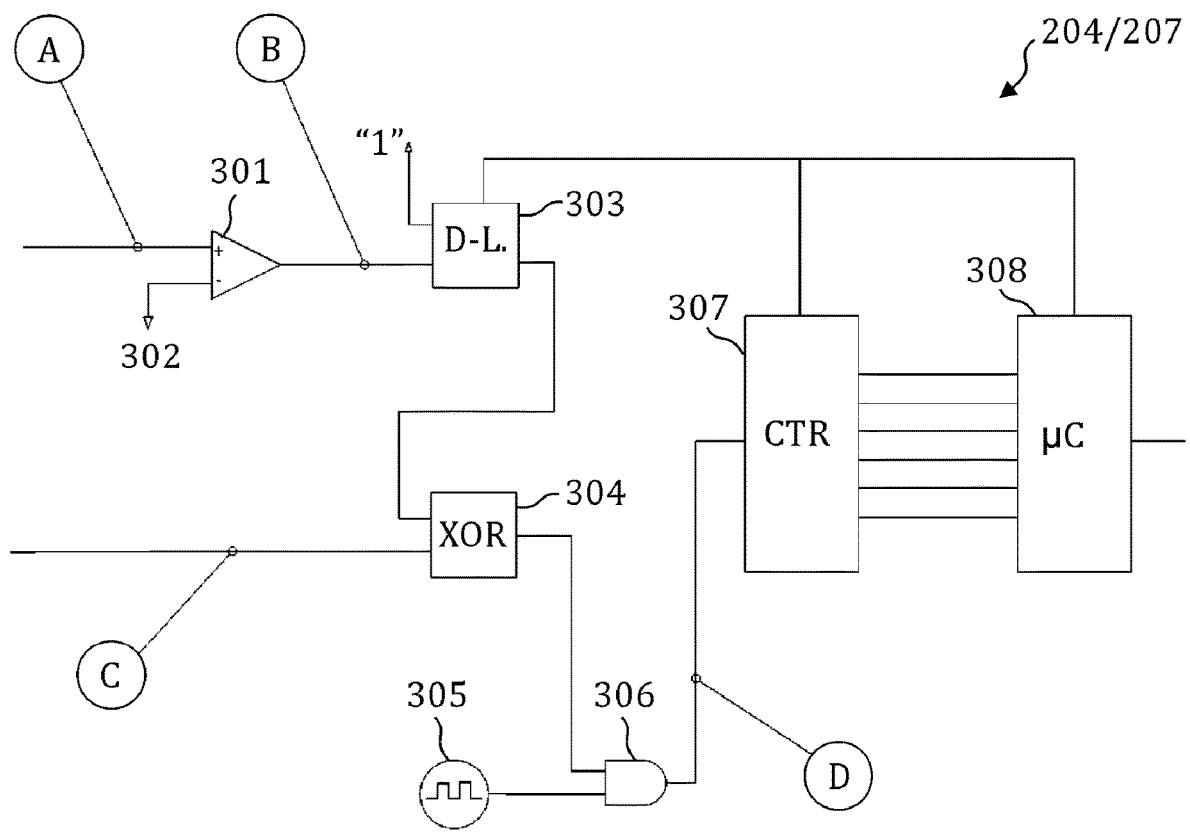
FIG. 3A illustrates an exemplary time measurement unit according to an embodiment.
Figure 3B:
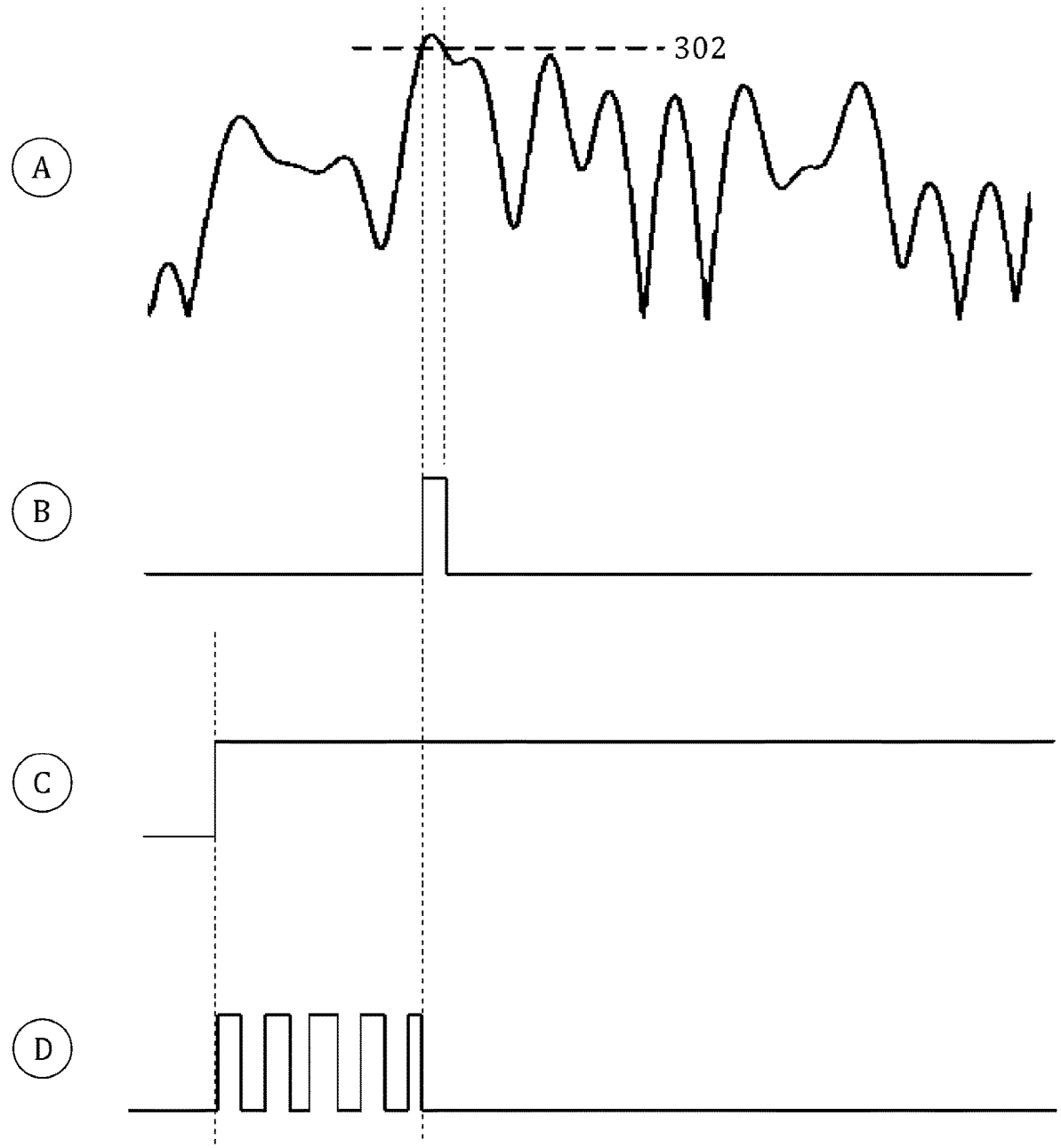
FIG. 3B illustrates exemplary signals associated with the time measurement unit of FIG. 3A.

FIG. 3A illustrate an example of a time measurement unit 204/207 of a radio node according to an embodiment while FIG. 3B illustrates four exemplary signals at locations A, B, C and D in the time measurement unit 204/207 indicated in FIG. 3A over one measurement occurrence. As indicated by the reference signs 204/207 used in FIG. 3A, the time measurement unit 204/207 of FIG. 3A may correspond equally to the receive-side time measurement unit 204 of FIG. 2 or to the transmit-side time measurement units 207 of FIG. 2. The four signals illustrated in FIG. 3B correspond to the same measurement of a time delay. While horizontal and vertical axes for the illustrated curves are not explicitly shown for simplicity of presentation in FIG. 3B, the change in a horizontal direction corresponds to a change in time while the change in the vertical direction corresponds to the change in an amplitude of the associated signal.

The time measurement unit 204/207 receives as inputs a (receive-side or transmit-side) envelope signal from the envelope detector and a time start pulse signal from the clock. The envelope signal and the time start pulse correspond, respectively, to the locations A and C within the time measurement unit 204/207. Exemplary time-domain presentations of the two signals are shown in FIG. 3B. Both the marker signal and the time start pulse are digital signals.

The time measurement unit 204/207 comprises at least a comparator 301, a D latch 303, an XOR gate 304, a clock 305 (different from the clock 210 of the first radio node or radio node 201), an AND gate 306, a pulse counter 307 and a microcontroller 308. In the following, the operation of each of said elements is discussed in detail.

The comparator 301 is configured to generate a marker signal based on the envelope signal and a pre-defined threshold 302, as discussed in connection with FIG. 2. The pre-defined threshold 302 (which is shown also in FIG. 3B with the envelope signal) may be adjustable. As described above, the marker signal may be generated by assigning a first value (e.g., 1 or other non-zero value) for one or more sections of the envelope signal exceeding a pre-defined transmit-side threshold for defining one or more markers and assigning a different value (e.g., 0) for (all) other sections of the envelope signal. In other words, the sections of the transmit-side envelope signal exceeding the pre-defined transmit-side threshold are used as markers. In other embodiments, the marker signal may be generated by assigning a first value (e.g., 1 or other non-zero value) for one or more sections of the envelope signal falling below a pre-defined transmit-side threshold for defining one or more markers and assigning a different value (e.g., 0) for (all) other sections of the envelope signal. Thus, the pre-defined transmit-side threshold may be a lower or upper threshold depending on the particular embodiment. The pre-defined threshold 302 may be implemented, e.g., as a voltage division circuit with an adjustable resistor or an adjustable voltage source configured to provide a controllable voltage to the comparator 301.

An example of the marker signal outputted by the comparator 301 (i.e., the signal at location B) is illustrated in part B of FIG. 3B. Specifically, FIG. 3B shows a marker signal with a single marker corresponding to a single section where the envelope signal exceeded the pre-defined threshold 302.

The D latch 303 is configured to receive the marker signal as a clock input and to output a Q signal. The D-input of the D latch 303 is set to receive a logical one. The D latch serves to capture said logical one of the D-input at a definite portion of the clock cycle defined by the clock input (i.e., the marker signal). Said definite portion of the clock cycle may be, for example, the rising edge of the clock. That captured value becomes the Q output. At other times, the output Q does not change. Thus, if the marker signal comprises a single marker, the Q signal comprises a single step. The D latch 303 may be resettable via its reset input (electrically connected at least to the microcontroller 308).

The XOR gate 304 is configured to receive a time start pulse of the clock of the first radio node and the Q signal (outputted by the D latch 303) and to output a transmit-side XOR output signal.

The clock 305 configured to provide a clock signal having a clock frequency.

The AND gate 306 is configured to receive the XOR output signal and the clock signal and to output an AND output signal defining pulses to be counted. The AND gate 306 is used as a switch for outputting only the pulses which are between the time start pulse (i.e., the step shown in part C of FIG. 3B) and a marker of the marker signal (or equally a step of the XOR output signal). An example of the AND output signal outputted by the AND gate 306 showing the property is illustrated in part D of FIG. 3B.

The pulse counter (CTR) 307 is configured to count pulses in the AND output signal and to output a counter output signal defining the number of counted pulses. The pulse counter 307 may be resettable via its reset input (electrically connected at least to the microcontroller 308).

The microcontroller (μC) 308 is configured to receive the counter output signal (i.e., to read the counter value of the pulse counter 307). By knowing the number of counted pulses and a clock frequency of the clock 305, microcontroller 308 is configured to measure a (first or second) time delay based on the number of counted pulses defined in the counter output signal and the transmit-side clock signal (i.e., the clock frequency of the clock 305). As described above, the microcontroller 308 may be configured also to reset the D latch 303 and/or the pulse counter 307. The resetting may be performed specifically following the measuring of the time delay value. The microcontroller 308 is further configured to output the measured time delay, for example, to the computing device of the first radio node.

Figure 4A:
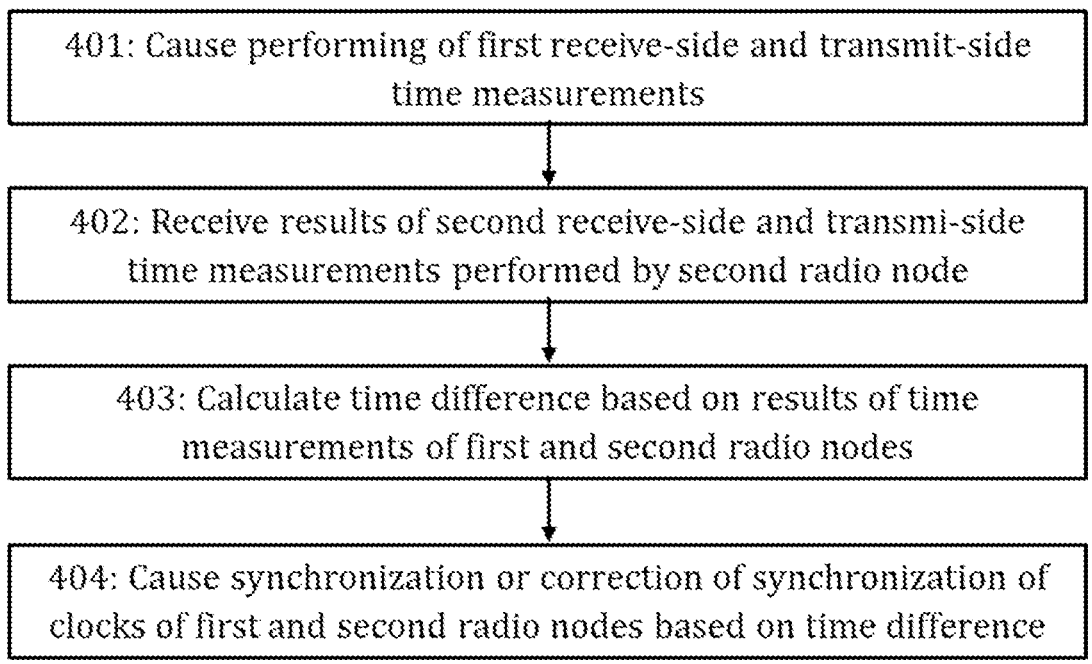
FIG. 4A illustrates an exemplary process according to an embodiment for performing clock synchronization or correction.
Figure 4B:
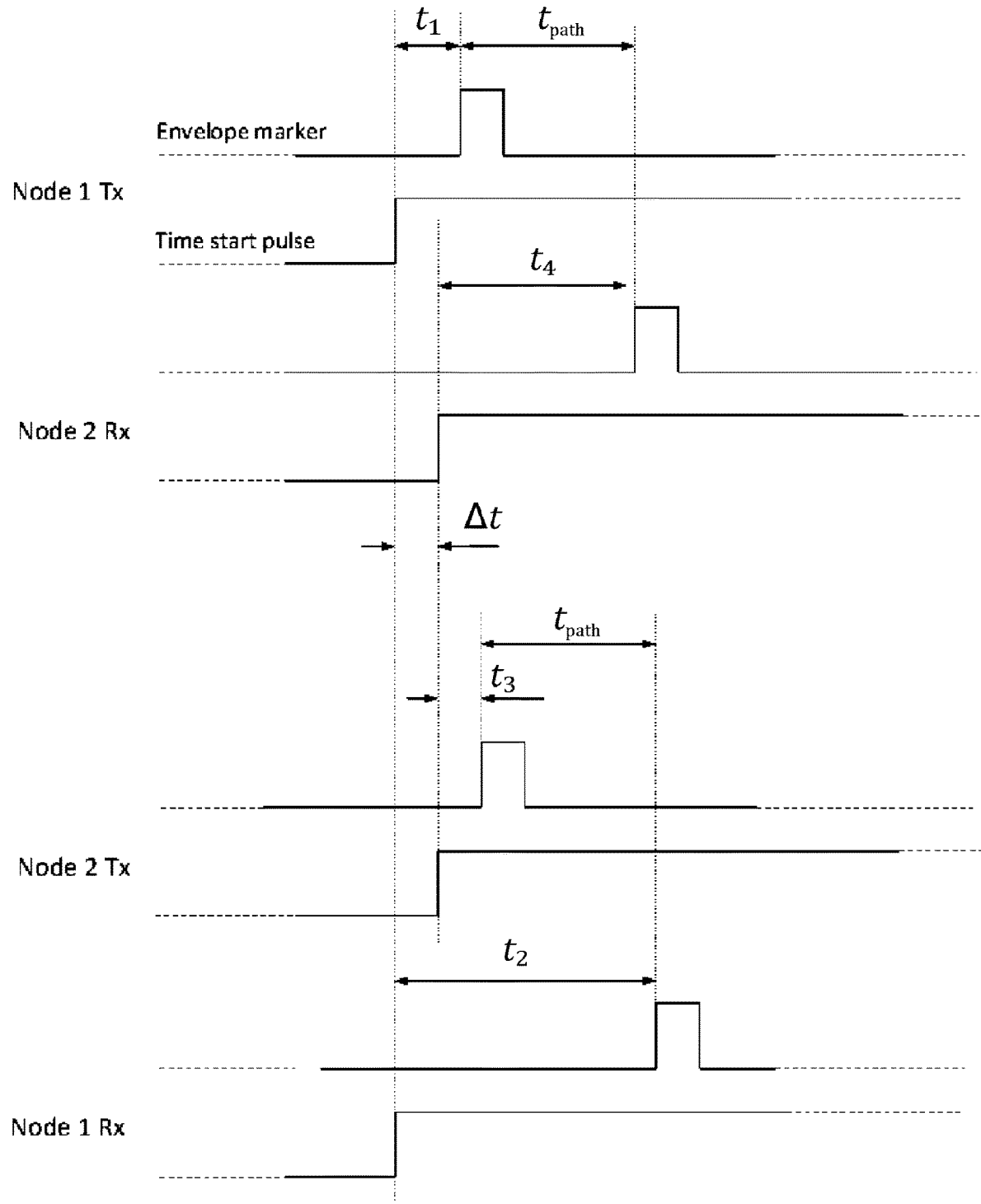
FIG. 4B illustrates exemplary signals associated with clock correction according to FIG. 4A.
Figure 4C:
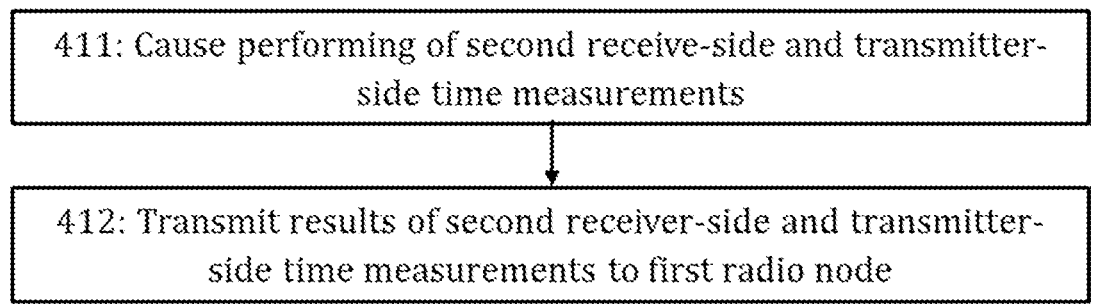
FIG. 4C illustrates an exemplary process according to an embodiment for enabling performing of clock synchronization or correction of FIG. 4A.

FIG. 4A illustrates an exemplary process according to an embodiment for performing clock correction or synchronization in a first radio node while FIG. 4B illustrates exemplary signals and measured time delay and time difference values associated with the clock correction. FIG. 4C illustrates a process performed by a second radio node for enabling said clock correction or synchronization in the first radio node. The illustrated process of FIG. 4A may be carried out, for example, by a first radio node such as the first radio node 201 of FIG. 2 or specifically by a computing device of a first radio node such as the computing device 219 of FIG. 2. The illustrated process of FIG. 4C may be carried out, for example, by a second radio node such as the second radio node 221 of FIG. 2 or specifically by a computing device of a second radio node. FIG. 4B may be applicable specifically to the embodiments where the purpose is improvement of existing synchronization between clocks of first and second radio node (i.e., not providing a stand-alone synchronization solution). While horizontal and vertical axes for the illustrated curves are not explicitly shown for simplicity of presentation in FIG. 4B, the change in a horizontal direction corresponds to a change in time while the change in the vertical direction corresponds to the change in an amplitude of the associated signal.

Referring to FIG. 4A, the computing device causes or triggers, in block 401, performing first receive-side and transmit-side time measurements using receive-side and transmit-side measurement units (and the sampling circuitry for sampling transmit and receive signals). Said first receive-side and transmit-side time measurements may comprise measurements of at least one first time delay $t_1$ (i.e., at least one transmit-side time delay) and at least one second time delay $t_2$ (i.e., at least one receive-side time delay) between time start pulses and transmit-side and receive-side (envelope) markers (e.g., start of the markers) of transmit-side and receive-side marker signals, respectively. Said first receive-side and transmit-side time measurements may be carried out as described in connection with FIG. 2 and optionally also with FIGS. 3A and 3B. In summary, the transmit-side marker signal is generated by assigning a first value for one or more sections of a transmit-side envelope signal exceeding or falling below a pre-defined transmit-side threshold for defining one or more markers and assigning a different value for other sections of the transmit-side envelope signal and the receive-side marker signal is generated by assigning a second value for one or more sections of a receive-side envelope signal exceeding or falling below a pre-defined receive-side threshold for defining one or more markers and assigning a different value for other sections of the receive-side envelope signal. The transmit-side and receive-side envelope signals are generated by taking an envelope of sampled transmit and receive signals of the first radio node.

Said performing of the first receive-side and transmit-side time measurements may initiated by causing the first radio node to transmit a first signal and to receive a second signal from the second radio node, where the time measurements are carried out based on said first and second signals. The first and second signals may be any arbitrary (modulated) signals transmitted or received by the first radio node, that is, no specific pilot or synchronization signals need to be employed like in conventional over-the-air (OTA) synchronization schemes. It is assumed here that the second radio node is also configured in a corresponding manner, that is, the performing of the receive-side and transmit-side time measurements is triggered substantially simultaneously at the first and second radio nodes. The computing device receives or retrieves, in block 402, results of second receive-side and transmit-side time measurements performed by the second radio node (in an analogous manner to the performing of the first receive-side and transmit-side time measurements by the first radio node). The results of the second receive-side and transmit-side time measurements may comprise at least one third time delay $t_3$, being transmit-side time delay(s), and at least one fourth time delay $t_4$, being a receive-side time delay(s), measured by the second radio node based on sampled transmit and receive signals of the second radio node. The second radio node generates the time start pulse according to its own clock (i.e., not using the same clock as the first radio node) and uses said time start pulse in measuring the at least one third and fourth time delays. The second receive-side and transmit-side time measurements may be received or retrieved directly from the second radio node (e.g., through a data channel or a control channel), from another device or via the Internet (e.g., from a cloud-based server). The first and second receive-side and transmit-side time measurements may be carried out substantially simultaneously by the first and second radio nodes so that the at least one first time delay and at least one fourth time delay correspond to the same signal(s) in transmission (by the first radio node) and reception (by the second radio node), respectively, and the at least one third time delay and at least one second time delay correspond to the same signal(s) in transmission (by the second radio node) and reception (by the first radio node), respectively.

As the first and second radio nodes used time start pulses generated based on their respective clocks, the time difference between the first and second radio nodes may be discerned based on the first, second, third and fourth time delays. Thus, the computing device calculates, in block 403, a time difference (Δt) between the first and second radio nodes based on results of first transmit-side and receive-side time measurements of the first radio node and the second transmit-side and receive-side time measurements of the second radio node, that is, at least based on first and second time delays measured by the first radio node and third and fourth time delays measured by the second radio node.

Because the radio path delay between the first and second radio nodes is the same in both directions (i.e., from the first radio node to the second radio node and vice versa), the following equation holds for the time delays and the time difference between the first and second radio nodes:

$$t_4 + \Delta t - t_1 = t_2 - \Delta t - t_3.$$

This equation may be further written as $$\Delta t = [(t_2 - t_3) - (t_4 - t_1)]/2.$$

Thus, the calculation of the time difference Δt in block 403 may be carried out simply using this equation.

The above equation for Δt is defined to give a positive value when the time of the first radio node is ahead of time of the second radio node. In other words, if the calculated time difference Δt is negative, then the time of the second radio node is ahead of the time of first radio node. Obviously, the time difference could be equally validly defined as $\Delta t = -[(t_2 - t_3) - (t_4 - t_1)]/2$ leading to an opposite sign convention.

The computing device causes, in block 404, (stand-alone) synchronization between the clocks of the first and second radio nodes or correction of existing synchronization between the clocks of the first and second radio nodes by causing adjusting the clock of the first radio based on the time difference and/or causing transmitting information on the time difference from the first radio node to the second radio node for adjusting the clock of the second radio node.

The first, second, third and fourth time delays $t_1 \ldots t_4$ may be measured bi-directionally, to both directions at same time. There is one transmit-side and one receive-side measurement ($t_1$ and $t_2$ in the first radio node and $t_3$ and $t_4$ in the second radio node) for each time start pulse. It would also be possible to measure one direction first and then the other direction, but that would take twice as much time. Because time start pulses are supplied in sequence, the time marker time measurements also form a sequence of measurements. The results may be stored, e.g., into a table in a memory.

FIG. 4B shows examples of the signals involved in the time difference calculation of block 403 of FIG. 4A. Namely, FIG. 4B shows, from top to bottom, the following four subfigures: a marker signal (i.e., an envelope marker signal) and a time start pulse measured at the first radio node at the transmit-side, a marker signal and a time start pulse measured at the second radio node at the receive-side, a marker signal and a time pulse signal measured at the second radio node at the transmit-side and a marker signal and a time pulse signal measured at the first radio node at the receive-side. The first, second, third and fourth time delays $t_1$, $t_2$, $t_3$ and $t_4$ are also explicitly indicated in the associated subfigures of FIG. 4B. The time difference $\Delta t$ calculated according to $\Delta t=[(t_2-t_3)-(t_4-t_1)]/2$ is also shown in FIG. 4B. The envelope markers in transmission and reception represent the same point in the envelope. The markers in reception are delayed relative to the markers in transmission for both of the first and second radio nodes due to path delay between the first and second radio nodes (indicated with $t_{path}$ in FIG. 4B).

FIG. 4C illustrates the steps which are at least performed by a second radio node so as to enable the clock synchronization or synchronization of FIG. 4A in the first radio node. The process of FIG. 4C may be performed by the second radio node in parallel with the performance of the process of FIG. 4A by the first radio node.

Referring to FIG. 4C, the second radio node causes, in block 411, performing second receive-side and transmit-side time measurements for obtaining at least one third time delay between a time start pulse of a clock of the second radio node and at least one marker of a transmit-side marker signal of the second radio node and at least one fourth time delay between the time start pulse of the clock of the second radio node and at least one marker of a receive-side marker signal of the second radio node. The measurements may be performed using transmit-side and receive-side measurement units of the second radio node (corresponding to the transmit-side and receive-side measurement units 202, 203 of the first radio node 201 as shown in FIG. 2). Thus, said second receive-side and transmit-side time measurements may be carried out similar to as described in connection with FIG. 2 and optionally also with FIGS. 3A and 3B for the first radio node.

The second radio node transmits, in block 412, information on said at least one third time delay and said at least one fourth time delay to the first radio node.

In some embodiments, both the first and second radio nodes may be configured to carry out all or most of the different steps of FIGS. 4A and 4C. In other words, both the first and second radio nodes may not only perform receive-side and transmit-side time measurements but also transmit results of said time measurements to the other radio node, receive results of the time measurements of the other radio node and possibly also perform clock synchronization or correction based on the time measurements carried out by the first and second radio nodes.

Figure 5:
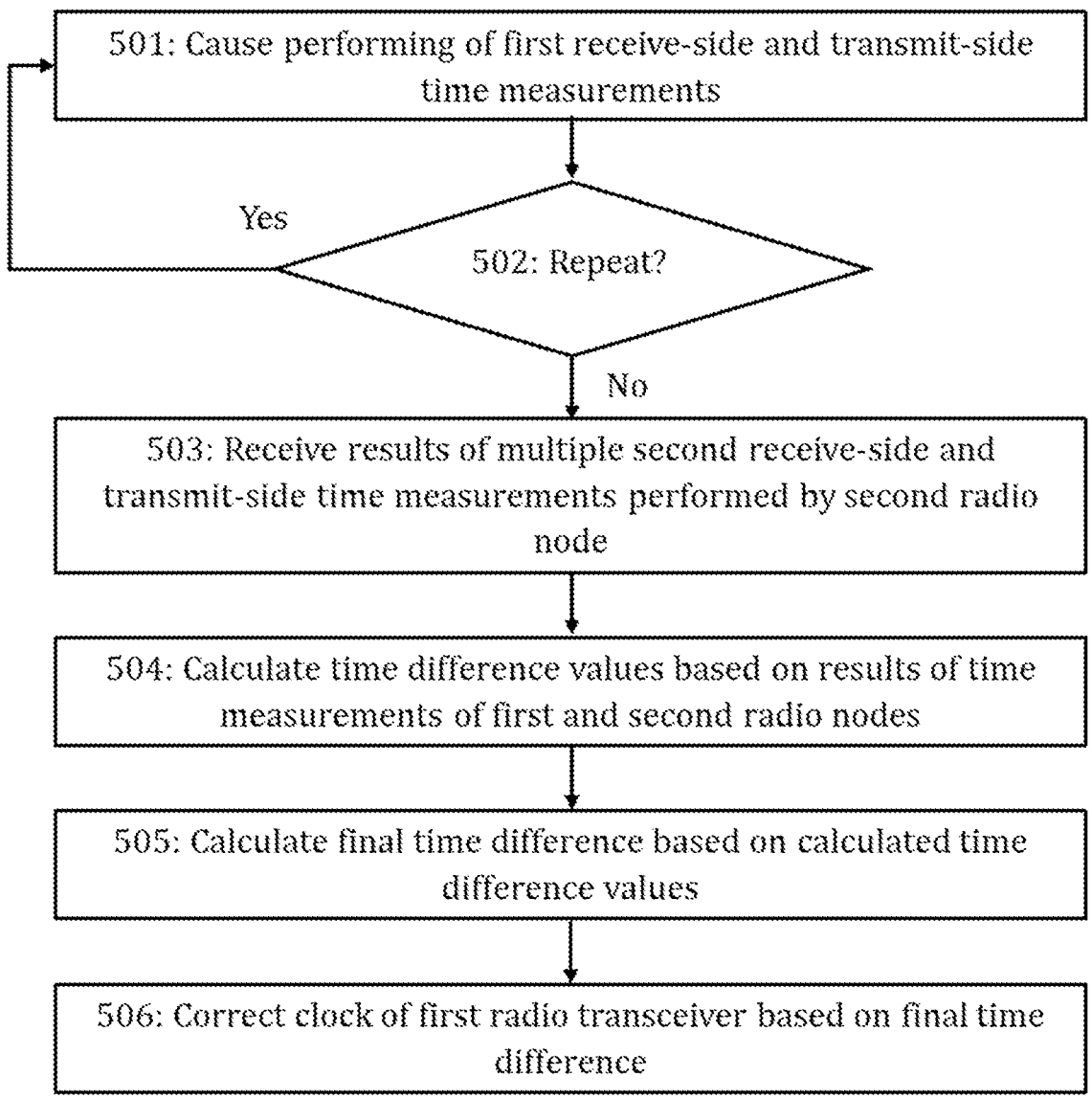
FIG. 5 illustrates another exemplary process according to an embodiment for performing clock synchronization or correction.

The time measurements as discussed in connection with FIGS. 4A and 4B may be carried out multiple times to be able to derive a reliable time difference value $\Delta t$. FIG. 5 illustrates an alternative exemplary process according to an embodiment for performing clock correction in a radio node with such repetitions. The illustrated process may be carried out, for example, by a first radio node such as the first radio node 201 of FIG. 2 or specifically by a computing device of a first radio node such as the computing device 219 of FIG. 2.

Referring to FIG. 5, the illustrated process corresponds to a large extent to the process of FIG. 4A. Any of the discussion provided above for FIG. 4A applies, mutatis mutandis, also for the FIG. 5, unless otherwise explicitly stated.

In FIG. 5, the computing device may cause, in block 501, performing multiple first transmit-side and receive-side time measurements using the receive-side and transmit-side (time) measurement units so as to acquire multiple values of the first and second time delays $t_1$ and $t_2$. In general, the rate of time measurements is same as the rate of time start pulses as one or two markers are measurable at every time start pulse. In bi-directional measurement, two markers per a time start pulse are measurable while a single marker per a time start pulse is measurable with a one-directional measurement. If the measurement margin is half of $T_{meas}$ (to be defined below), the probability that a false marker ruins a measurement is approximately 50%. Because both directions should be correct, it means that half of the calculated results are correct and half of the results are false.

Specifically, the computing device, first, causes (or triggers), in block 501, performing first transmit-side and receive-side time measurements using the receive-side and transmit-side time measurement units so as to acquire values of the first and second time delays $t_1$ and $t_2$, as described in previous embodiments.

Then, the computing device determines, in block 502, whether or not said time measurements should be repeated based on one or more first pre-defined criteria. The one or more first pre-defined criteria may define, for example, a pre-defined number of times that the first transmit-side and receive-side time measurements need to be performed (i.e., the number of first and second time delays that need to be measured). Said pre-defined number of times (i.e., the number of repetitions) may be, for example, any integer larger than or equal to 5 (depending on the desired reliability for the calculation). In an embodiment, said pre-defined number of times may be an integer from 5 to 20 or 10 to 20.

The required number of the repetitions may depend on the ratio of false and correct markers. If the measurement margin is half of the $T_{meas}$ (see definition below), the probability that a false marker ruins a measurement is approximately 50%. Because both directions should be correct, it means that half of the calculated results are correct and half of the results are false. It may be assumed that correct calculations of $\Delta t$ (that is, calculation based on correct markers) all give at least approximately the same value while incorrect calculations of $\Delta t$ may give values which are uniformly spread over all possible values for $\Delta t$. For example, out of 20 calculations of time difference $\Delta t$, 10 calculations give an (approximately) equal result and the rest may give results, which, most probably, all are different. The required number of the repetitions given in the one or more first pre-defined criteria may be defined, e.g., based on previous $\Delta t$ statistics so that there is a high probability that at least a certain pre-defined number of correct time difference calculations (e.g., 5 to 10), i.e., a certain pre-defined number of time difference calculations resulting in substantially the same value, are performed.

The computing device receives, in block 503, a plurality of values of the third and fourth time delays $t_3$ and $t_4$ measured by the second radio node. It may be assumed here the first and second radio nodes are configured to perform the measurement in the same way. The one or more first pre-defined criteria may be defined to be the same in the first radio node and in the second radio node so that the number of the plurality of values of the third and fourth time delays is equal to the number of the plurality of values of the first and second time delays. In other embodiments, the one or more first pre-defined criteria may be defined differently in the first radio node and in the second radio node so that the number of the plurality of values of the third and fourth time delays is not equal to the number of the plurality of values of the first and second time delays.

The computing device calculates, in block 504, a plurality of time difference values based on the plurality of first, second, third and fourth time delays (i.e., one time difference value per a set of first, second, third and fourth time delays values).

The computing device calculates, in block 505, a final time difference (for clock correction or synchronization) based on said plurality of time difference values. For example, the final time difference may be calculated as the mode of the plurality of time difference values (i.e., the most frequent value among the plurality of time difference values). As is typical practice for taking a mode of a continuous distribution (such as the Δt distribution here), the Δt data may be discretized, e.g., by assigning frequency values to intervals of equal distance, as for making a histogram, effectively replacing the values by the midpoints of the intervals they are assigned to. The mode is then the value where the histogram reaches its peak.

The computing device causes, in block 506, correction of the synchronization of the clock of the first radio node or synchronizing of the clock of the first radio node (i.e., performing stand-alone synchronization) based on the calculated final time difference.

Alternatively, instead of using all the measured time delays $t_1$, $t_2$, $t_3$ and $t_4$ to calculate the final time difference, the results corresponding to false markers may be, first, separated from the results for correct markers, and only the results for the correct markers (or the associated Δt values) may be used for calculating the final time difference in block 505. In such a case, the aforementioned mode calculation may also be employed. Alternatively, the final time difference may be calculated simply as an average of the Δt values calculated for the correct markers.

If the envelope shape is distorted, e.g., due to multipath propagation, false markers may be generated in reception. In that case, there may also be a need for increasing the number of repetitions of the time measurements to achieve a desired number of (approximately) equal time difference values (e.g., 5 to 10). The number of repetitions does not need to be fixed, it can also be adjusted adaptively to cover the possible changes in false-correct-marker-ratio during the operation. Although 5 to 10 (approximately) equal results are enough for deriving a reliable synchronization, there can be also some extra averaging needed to improve the accuracy. This may require carrying out more measurements and, therefore, leads to a longer time for achieving synchronization.

When the measurement procedure as defined in block 401 of FIG. 4A or block 411 of FIG. 4C or block 501 of FIG. 5 starts simultaneously in both radio nodes, there will be no time offset between transmit-side and receive-side measurement sequences and picking up correct time values (i.e., time values which represent the same envelope marker in Tx and Rx) for the Δt calculation is straightforward. It does not matter if the measurements do not start at the same time, but then the time offset between measurement sequences must be found out with a proper algorithm (e.g., just by comparing the results). It is enough to do this only once, because the time offset remains constant between the consecutive time measurements.

Figure 6A:
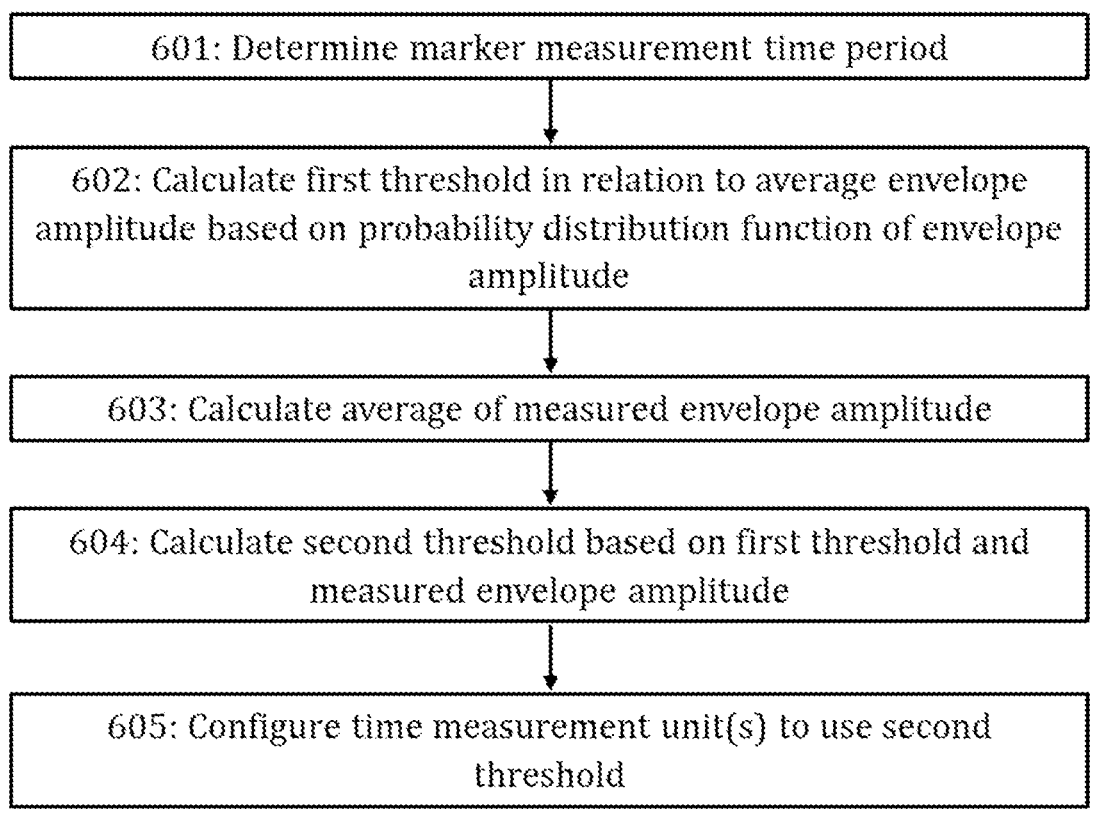
FIG. 6A illustrates an exemplary process according to an embodiment for performing clock synchronization or correction.
Figure 6B:
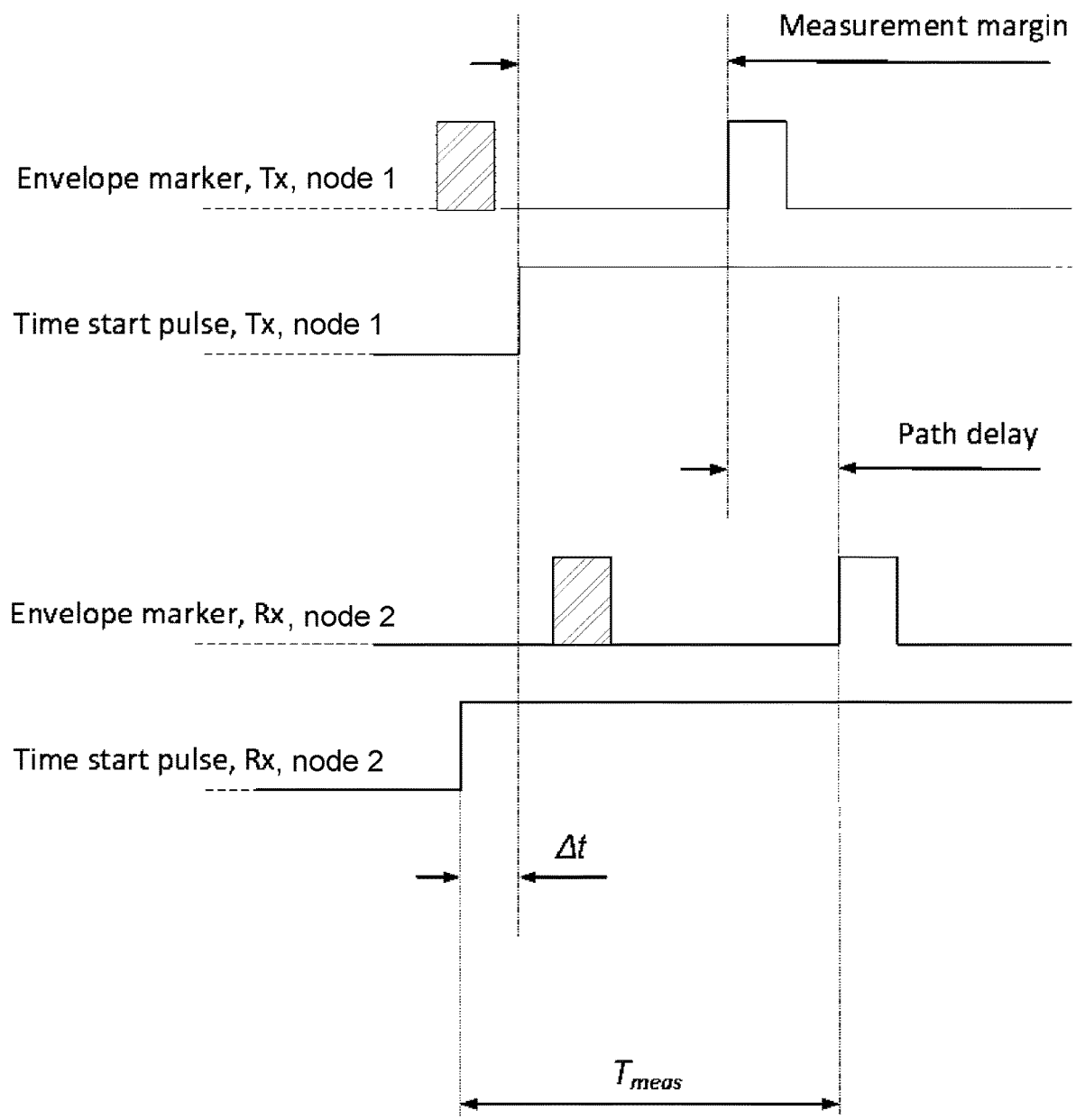
FIG. 6B illustrates exemplary signals and time periods associated with the clock correction according to FIG. 6A.
Figure 6C:
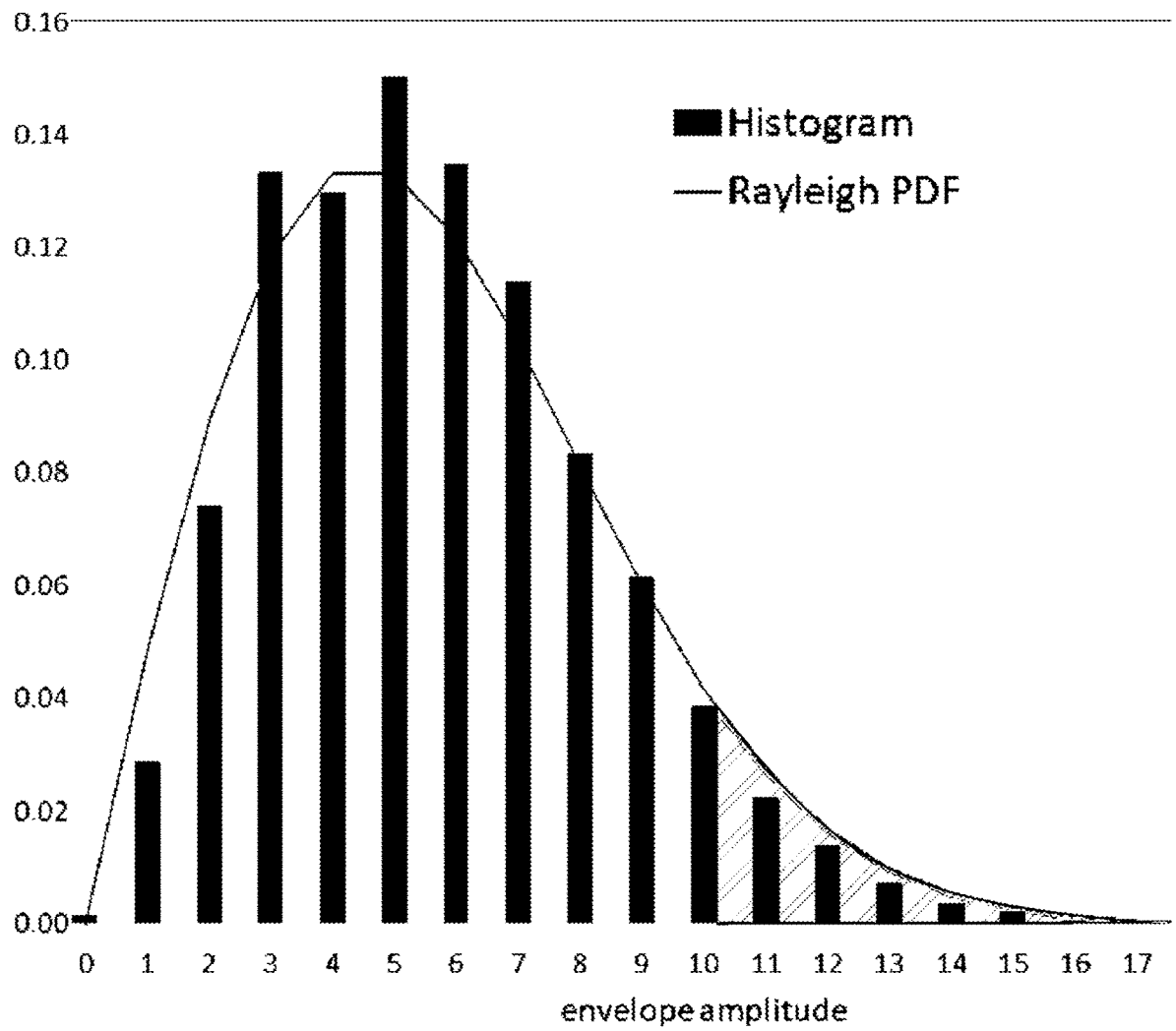
FIG. 6C illustrates an exemplary histogram and an exemplary probability distribution (namely, a Rayleigh probability density function) for an amplitude of an envelope signal.

The results acquired using the time measurement procedure discussed in connection with FIGS. 4A and 4B and 5 are dependent strongly on how the pre-defined transmit-side and receive-side thresholds (i.e., the pre-defined thresholds configured to the comparators of the transmit-side and receive-side time measurement units) at the first and second radio nodes are configured or defined. FIG. 6A illustrates an exemplary process according to an embodiment for deriving a value for said threshold(s) while FIG. 6B illustrates exemplary signals of the first and second radio nodes associated with said process and FIG. 6C illustrates an exemplary probability distribution (namely, a Rayleigh probability density function) and an exemplary histogram associated with said process. The illustrated process may be carried out, for example, by a first radio node such as the first radio node 201 of FIG. 2 or specifically by a computing device of a first radio node such as the computing device 219 of FIG. 2. The illustrated process may be carried out equally also by a second radio node such as the first radio node 211 of FIG. 2 or specifically by a computing device of a second radio node (preferably substantially simultaneously with the performing of the process by the first radio node). The procedure of FIG. 6A may be carried out before the procedure of FIG. 4A or 5. FIGS. 6B and 6C may be applicable specifically to the embodiments where the purpose is improvement of existing synchronization between clocks of first and second radio node (i.e., not providing a stand-alone synchronization solution). While horizontal and vertical axes for the illustrated curves are not explicitly shown for simplicity of presentation in FIG. 6B, the change in a horizontal direction corresponds to a change in time while the change in the vertical direction corresponds to the change in an amplitude of the associated signal.

In general, the envelope signal is random and therefore the generated markers occur also randomly. By adjusting the value of the threshold (of the comparator), it is easy to control how often the markers appear. The pre-defined threshold may correspond to a controllable, fixed voltage level (provided to a comparator). The control of the threshold may be accomplished with different ways, e.g., using a voltage division circuit with an adjustable resistor or using an adjustable voltage source. An embodiment uses a voltage division circuit with a trimmer resistor.

The level of the threshold should be set so, that, on average, there is approximately one marker within a certain marker measurement time period $T_{meas}$ (equally called a time marker measurement time period or an envelope marker measurement time period). The marker measurement time period $T_{meas}$ is a time period during which the time delay between a time start pulse of the clock of a (first/second) radio node and a marker of the transmit-side/receive-side marker signal is measured (or is measurable). In other words, the transmit-side and/or receive-side marker signal is defined to cover at least the marker measurement time period $T_{meas}$ (starting from the start of the time start pulse). Minimum marker measurement time period is equal to the radio path delay plus the time difference between the clocks of the first and second radio nodes so that the same marker may be generated at Tx and Rx. In addition, some measurement margin is typically needed. The measurement margin may be at least half of the marker measurement time period $T_{meas}$. FIG. 6B shows how the marker measurement time period $T_{meas}$ is composed of the time difference, the measurement margin and the radio path delay. In FIG. 6B, Δt denotes the time difference between the time start pulses, corresponding the time difference between the clocks of the first and second radio nodes. In other words, the marker measurement time period $T_{meas}$ is formed as a sum of the time difference Δt, the measurement margin and the radio path delay.

To cover the marker measurement time period $T_{meas}$, the counter bit number N and the counter clock frequency $f_{clock}$ should be chosen appropriately. The counter clock frequency $f_{clock}$ may correspond here specifically to a clock frequency of the clock 305 of FIG. 3A. Counter is not allowed to overflow to give correct results, which gives the limiting equation:

$$T_{meas} \leq 1/f_{clock} \times 2^N$$

where the counter clock frequency $f_{clock}$ gives the resolution for the measurement and therefore also determines the synchronization accuracy.

Thus, the initial step of process of FIG. 6B is that the computing device determines or sets, in block 601, the marker measurement time period $T_{meas}$ based on measurement requirements. The marker measurement time period $T_{meas}$ may be defined as described above. The marker measurement time period $T_{meas}$ may have a value satisfying the equation $T_{meas} \leq 1/f_{clock} \times 2^N$ In some embodiments, the envelope market measurement time may be pre-defined (and thus block 601 may be omitted).

The computing device calculates, in block 602, a first threshold for a normalized amplitude of the envelope signal based on a probability distribution of the amplitude of the envelope signal (e.g., a probability density function of the amplitude of the envelope signal) and the marker measurement time period (configured to the transmit-side and/or receive-side time measurement units). The calculation in block 602 may further be based on a bandwidth of the RF modulation. The first threshold may be specifically a threshold which is normalized to the average amplitude of the envelope signal (that is, not the aforementioned threshold applicable directly to the comparator).

The probability distribution of the amplitude of the envelope signal may be obtained, for example, by measuring or simulating the amplitude of the envelope signal and generating a histogram out of it. One example of such a histogram is shown in the FIG. 6C. Another alternative is to use a (Rayleigh) probability density function (PDF) of the amplitude of the envelope signal, if it is known. FIG. 6C also shows an example of a Rayleigh PDF for the amplitude of the envelope signal. Typically, the amplitude of the envelope signal follows the PDF of the Rayleigh distribution, as depicted also in FIG. 6C. Referring to FIG. 6C, the PDF has a total area of 1 underneath the curve and the histogram is normalized so, that all the bar values add up to 1. Further, the horizontal axis is envelope amplitude in voltage and vertical axis is probability density.

Probability that the amplitude of the envelope signal exceeds a certain pre-defined level (e.g., as defined by a pre-defined threshold) is equal to the area which is underneath the probability density function following said pre-defined level (i.e., the area to the right of the x-axis value matching the pre-defined level). For example, in FIG. 6C, the probability that the amplitude exceeds the value 10 is equal to the area under the PDF curve colored with a diagonal-line pattern. In other words, the probability may be calculated, in this case, by integrating the PDF from 10 to infinity.

On the other hand, probability that the amplitude of the envelope signal falls below a certain pre-defined level is equal to the area which is underneath the probability density function preceding said pre-defined level (i.e., the area to the left of the x-axis value matching the pre-defined level). In other words, the probability may be calculated, in this case, by integrating a probability density function from 0 to said pre-defined level.

Assuming that $BW_{mod}$ is the bandwidth of the RF modulation and P is the probability that the amplitude of the envelope signal exceeds (or falls below) the first threshold, we can derive an equation for the average time between markers which exceed (or fall below) the first threshold $T_{avg}$:

$$T_{avg} \cong 1/(2 \times P \times BW_{mod}) = T_{meas}.$$

Here, the derived average marker measurement time period $T_{avg}$ is denoted as being the same as $T_{meas}$ as we want to have one marker, on average, at every measurement time $T_{meas}$. Conversely, the probability P may be calculated knowing the average marker measurement time period $T_{meas}$ and the bandwidth of the RF modulation as $$P = 1/(2 \times T_{meas} \times BW_{mod}).$$

In the above equations, the derived time is defined to be equal to $T_{meas}$ as we want to have one marker, on average, within each marker measurement time period $T_{meas}$. This equation may be used in connection with both orthogonal frequency division multiplexing (OFDM) and single carrier signals.

When the marker measurement time period $T_{meas}$ is determined according to the measurement requirements, as shown in FIG. 6B, and $BW_{mod}$ is known, then it is possible to calculate the needed probability P and determine (or read out) the corresponding (non-normalized) first threshold from the probability distribution (e.g., from a probability density function like the one shown in FIG. 6C). For example, if we have 20 MHz LTE signal and $T_{meas}$ is 0.28 μs, we can calculate P to be about 9%, which corresponds to the first threshold of 10 (the first threshold being assumed, in this example, to be an upper threshold which must be exceeded to generate a marker).

In other words, the calculating of the first threshold in block 602 may comprise:
1) calculating the probability P that the amplitude of the envelope signal exceeds (or falls below) certain first threshold based on the marker measurement time period $T_{meas}$ and the bandwidth of the RF modulation $BW_{mod}$ (using the above equation),
2) calculating a non-normalized first threshold based on the probability P and a probability distribution (e.g., a PDF) of the amplitude of the envelope signal and
3) normalizing the non-normalized first threshold with an average of the amplitude of the envelope signal.

The average of the amplitude of the envelope signal may be calculated based on the probability distribution (e.g., the PDF) of the amplitude of the envelope signal between steps 2) and 3) or it may be pre-defined (i.e., calculated previously and stored to a memory).

In other embodiments, the probability distribution may be a probability distribution of a normalized amplitude of the envelope signal (being normalized to an average amplitude of the envelope signal). In such a case, the first threshold may be read or calculated directly from a probability density function (i.e., the step 3) may be omitted).

In order to get the equal triggering point for marker generation in both the first and second radio nodes, the computing device needs to calculate a correct, real voltage value for a second threshold being the threshold applied to the comparator (called a pre-defined threshold in the previous embodiments). This is done by relating the first threshold calculated in block 602 and some other real envelope parameter (e.g., a measured amplitude of the envelope signal or specifically an average thereof) together. The determining of the second threshold may be carried out in two parts. Namely, first the computing device calculates, in block 603, an average of the measured amplitude of the envelope signal and then calculates, in block 604, the second threshold based on said average of the measured amplitude of the envelope signal and the first threshold (namely, by scaling the first threshold, being a normalized threshold, with an average of the measured amplitude of the envelope signal). The second threshold may be simply the first threshold multiplied with the average of the measured amplitude of the envelope signal. The measured amplitude of the envelope signal may correspond here to an amplitude of the envelope signal which is fed to the comparator 301 in FIG. 3A.

In some embodiments, the average of the envelope amplitude may be pre-defined (i.e., maintained in a memory) and thus block 603 may be omitted.

The average value of the measured amplitude of the envelope signal can be calculated or detected in variety of different ways. One simple alternative is just to low-pass-filter the envelope signal and measure the direct current (DC) level of the low-pass-filtered envelope signal.

Once the second threshold has been calculated in block 604, the computing device causes, in block 605, configuration of the receive-side and/or transmit-side time measurement unit (or specifically the comparator(s) therein) to use said second threshold.

It should be noted that it is not always critical to have exactly one marker, on average, at a given marker measurement time period $T_{meas}$. If markers appear less than once per marker measurement time period $T_{meas}$, then a longer time needs to be measured to acquire at least one envelope marker. If markers appear more often than once per marker measurement time period $T_{meas}$, the likelihood of getting false markers increases. Requiring a longer measurement time or getting false markers are, however, not huge problems as it is possible to measure, e.g., hundreds or thousands of markers per second, depending on how frequently the clock of the radio node can supply time start pulses.

Because the time measurement unit measures the time between the time start pulse and the first envelope marker after the time start pulse, it may happen, that the receive-side measurement unit of a radio node measures a different marker from what the transmit-side measurement unit measures. An example of a false marker is shown in FIG. 6B. The false marker is colored in with diagonal-line pattern. So, instead of measuring a correct marker, the receive-side measurement unit measures a false one, because the false marker arrives before the correct marker.

Figure 7:
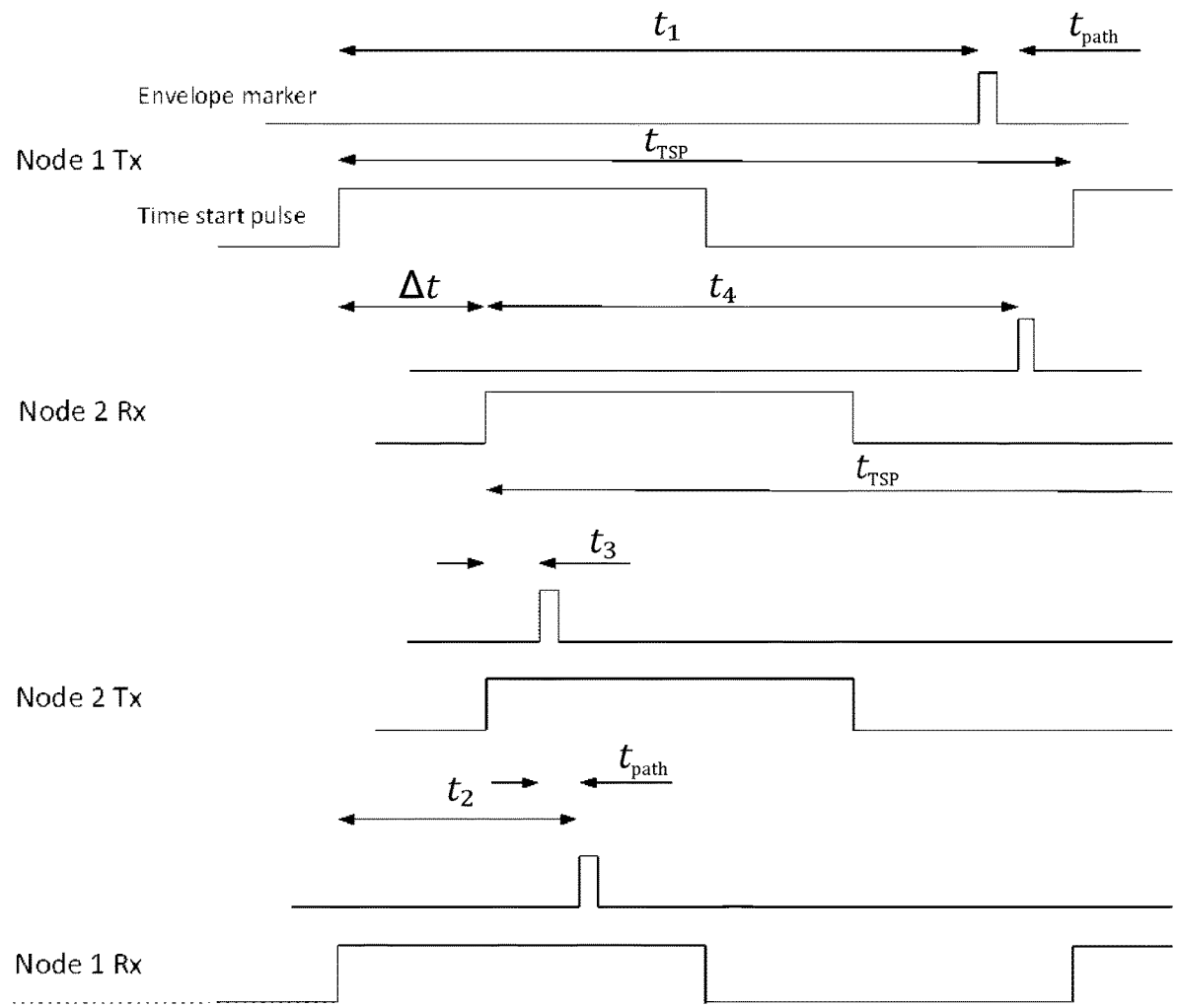
FIG. 7 illustrates exemplary signals associated with standalone clock synchronization.

As was previously mentioned above, the embodiments may be applied either to improving an existing synchronization or to providing stand-alone synchronization. In the following, the latter case is discussed in more detail in connection with FIG. 7 showing exemplary envelope marker and time start pulse signals and associated quantities. Namely, FIG. 7 shows, from top to bottom, the following four subfigures: a marker signal (i.e., an envelope marker signal) and a time start pulse measured at the first radio node at the transmit-side, a marker signal and a time start pulse measured at the second radio node at the receive-side, a marker signal and a time pulse signal measured at the second radio node at the transmit-side and a marker signal and a time pulse signal measured at the first radio node at the receive-side. The first, second, third and fourth time delays $t_1$, $t_2$, $t_3$ and $t_4$, the radio path delay $t_{path}$ between the first and second radio nodes and the time difference $\Delta t$ between the first and second radio nodes are also explicitly indicated in the associated subfigures of FIG. 7.

For enabling stand-alone synchronization, the marker measurement time period $T_{meas}$ may be approximately equal to the period of time start pulse ($t_{TSP}$), as depicted in FIG. 7. Thus, the marker measurement time period $T_{meas}$ may be typically considerably larger than in the case where the aim is to merely correct the existing synchronization of the clock. This means, that markers occurs less frequently and, therefore, the threshold applied to the comparator(s) will be higher. As the marker measurement time period is larger, measuring of the time marker times (i.e., the first, second, third and fourth time delays $t_1$, $t_2$, $t_3$ and $t_4$) accurately is more demanding.

The time difference $\Delta t$ may be calculated, as in the previous embodiments, according to $\Delta t=\pm[(t_2-t_3)-(t_4-t_1)]/2$ (±indicating two alternative sign conventions). However, the time difference $\Delta t$ may now be between $-t_{TSP}$ and $+t_{TSP}$.

Considering the implementation of such embodiments, it may be beneficial to use a combination of two or more counters or two or more time-to-digital converters (TDCs) where some of the counters/TDCs may be used specifically for coarse measurements while others may be used specifically for fine measurements.

Another alternative is to use only one counter which is adjusted dynamically (e.g., by the computing device) so that its clock frequency can be made to cover different marker measurement time periods. In other words, when the marker measurement time period $T_{meas}$ is long, the clock frequency of the counter is configured to be low and when the marker measurement time period $T_{meas}$ is short, the clock frequency of the counter is configured to be high. With such dynamic adjustments, the relative accuracy may be kept constant despite of the varying marker measurement time period $T_{meas}$.

To achieve an even higher accuracy, the synchronization routine may be performed step-by-step. In other words, initially a long marker measurement time period $T_{meas}$ may be employed and the time difference $\Delta t$ may be calculated based thereon and the clock(s) of the first and second radio nodes may be configured based on the time difference, as discussed above (e.g., in connection with FIG. 4A or 5 and 6A). Then, the marker measurement time period $T_{meas}$ may be reduced and the calculating of the time difference $\Delta t$ and configuring of the clock(s) may be repeated.

The chosen time start pulse period $t_{TSP}$ depends on, what the requirements for the time synchronization are in the system. Because the embodiments carry out the clock synchronization by comparing time markers to a reference (namely, to a time start pulse), only the same or shorter time duration, as what is the period of the reference can be aligned. In other words, because a clock signal repeats itself with a given pulse period, it is impossible for two clocks to get a mutual timing which is longer than said pulse period. For example, in the time-division duplexing (TDD) system, if 1 ms Tx/Rx bursts which need to be aligned in time are employed, the time start pulse period should be equal to or higher than 1 ms to provide a reliable time synchronization for the system.

In the above discussion, it was assumed that the time start pulses (i.e., reference times) produced by the first and second radio nodes are not drifting. This assumption may hold well for embodiments where the calculated time difference is used for correcting an existing synchronization though less well for embodiments where the calculated time difference is used for stand-alone synchronization. In practice, when two clocks are not synchronized to each other, some amount of clock drift always exists between said two clocks. Namely, there always exists a frequency offset between clocks which produces a certain time drift. For example, using clocks with a frequency error of 1 ppm between them, the time drift 1 ns for each 1 ms period. Thus, the calculated time difference(s) $\Delta t$ are always affected by the clock drift at least to some extent, i.e., the time difference $\Delta t$ changes over time. When deriving the clock synchronization (or clock correction), the clock drift may be taken account (i.e., the clock time may be corrected to eliminate the effect of the clock drift). The amount of clock drift may be evaluated by observing the change in the time difference $\Delta t$ over time. Knowing the amount of clock drift (after the $\Delta t$ calculations), it is also possible to derive the frequency error between the clocks of the radio nodes and to frequency-lock them together.

The blocks, related functions, and information exchanges described above by means of FIGS. 4A, 4C, 5 and 6A are in no absolute chronological order, and some of them may be performed simultaneously or in an order differing from the given one. Other functions can also be executed between them or within them, and other information may be sent and/or received, and/or other mapping rules applied. Some of the blocks or part of the blocks or one or more pieces of information can also be left out or replaced by a corresponding block or part of the block or one or more pieces of information.

Figure 8:
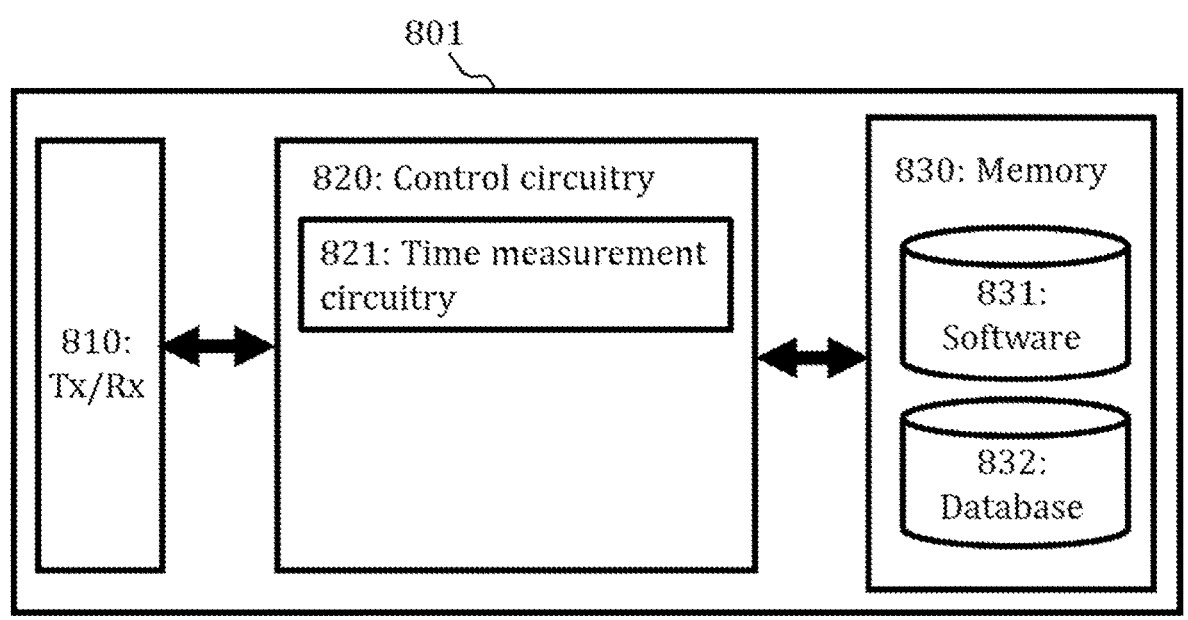
FIG. 8 illustrates an apparatus according to an embodiment.

FIG. 8 provides an apparatus 801 according to some embodiments. FIG. 8 may illustrate a radio node or a part thereof (e.g., a computing device comprised in the radio node) configured to carry out at least the functions described above in connection with the radio node (that is, the first or second radio node) and the computing device. The apparatus 801 may correspond to any of the terminal devices 100, 102 of FIG. 1 and/or the access/relay node or distributed unit 104 of FIG. 1 and/or the computing device 219 of FIG. 2.

The apparatus 801 may comprise one or more communication control circuitry 820, such as at least one processor, and at least one memory 830, including one or more algorithms 831, such as a computer program code (software) wherein the at least one memory and the computer program code (software) are configured, with the at least one processor, to cause, respectively, the apparatus to carry out any one of the exemplified functionalities of the computing device (or the radio node) as described above.

Referring to FIG. 8, the communication control circuitry 820 of the apparatus 801 comprises at least time measurement circuitry 821. The time measurement circuitry 821 may be configured to carry out at least some of the functionalities of the computing device (and/or the radio node) described above by means of any of FIGS. 2, 3A, 3B, 4A, 4B, 4C, 5, 6A, 6B, 6C and 7 using one or more individual circuitries.

The at least one memory 830 may comprise at least one database 832 which may comprise, for example, values of the first, second, third and fourth time delays ($t_1$, $t_2$, $t_3$ and $t_4$), values of the time difference ($\Delta t$) between radio nodes, the (average) marker measurement time period $T_{meas}$, the bandwidth of the RF modulation $BW_{mod}$, and/or statistical information regarding the envelope signal and amplitude thereof (e.g., PDF (s), histogram(s) and/or average(s)). Each memory 830 may comprise software and at last one database. The memory 830 may also comprise other databases which may not be related to the functionalities of the apparatus according to any of presented embodiments.

The at least one memory 830 may be implemented using any suitable data storage technology, such as semiconductor based memory devices, flash memory, magnetic memory devices and systems, optical memory devices and systems, fixed memory and removable memory.

Referring to FIG. 8, the apparatus 801 may further comprise different interfaces 810 such as one or more communication interfaces (TX/RX) comprising hardware and/or software for realizing communication connectivity over one or more communications network according to one or more communication protocols. Specifically, the one or more communication interfaces 810 may provide the apparatus with communication capabilities to communicate in one or more mobile networks and enable communication with the second radio node, one or more access nodes, one or more terminal devices (possibly via said plurality of access nodes) and/or one or more other network nodes or elements. The one or more communication interfaces 810 may enable communication with (and control of) the receive-side and transmit-side measurement units or specifically at least with the receive-side and transmit-side time measurement units therein and/or the clock of the first radio node.

The one or more communication interfaces 810 may comprise standard well-known components such as an amplifier, filter, frequency-converter, analog-to-digital converts, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In embodiments, the at least one processor, the memory, and the computer program code form (processing) means for or comprises one or more computer program code portions for carrying out one or more operations according to any one of the embodiments of FIGS. 4A, 4B, 4C, 5, 6A, 6B, 6C and 7 or operations thereof.

In an embodiment, at least some of the processes described in connection with of FIGS. 4A, 4B, 4C, 5, 6A, 6B, 6C and 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 4A, 4B, 4C, 5, 6A, 6B, 6C and 7 or operations thereof.

According to an aspect, there is provided an apparatus (e.g., a host (computing) device or a part thereof) comprising means for performing:

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2, 3A, 3B, 4A, 4B, 4C, 5, 6A, 6B, 6C and 7 may be carried out, fully or at least in part, by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

A computer program stored in a computer-readable storage medium, the program comprising software code for performing the steps of:
cause performing first receive-side and transmit-side time measurements in a first radio node (e.g., using an apparatus comprising at least elements 217, 202, 203 of FIG. 3A) at least for obtaining at least one first time delay between a time start pulse of a clock of the first radio node and at least one marker of a transmit-side marker signal of the first radio node and at least one second time delay between the time start pulse of the clock of the first radio node and at least one marker of a receive-side marker signal of the first radio node, wherein the transmit-side marker signal is generated (in the first radio node) by assigning a first value for one or more sections of a transmit-side envelope signal exceeding or falling below a pre-defined transmit-side threshold for defining one or more markers and assigning a different value for other sections of the transmit-side envelope signal and the receive-side marker signal is generated (in the first radio node) by assigning a second value for one or more sections of a receive-side envelope signal exceeding or falling below a pre-defined receive-side threshold for defining one or more markers and assigning a different value for other sections of the receive-side envelope signal, the transmit-side and receive-side envelope signals being generated by taking an envelope of sampled transmit and receive signals of the first radio node;
receive or retrieve information on at least one third time delay between a time start pulse of a clock of the second radio node and at least one marker of a transmit-side marker signal of the second radio node and at least one fourth time delay between the time start pulse of the clock of the second radio node and at least one marker of a receive-side marker signal of the second radio node;
calculate a time difference between the first and second radio nodes based on the at least one first, second, third and fourth time delays; and
cause synchronization or correction of existing synchronization between the clocks of the first and second radio nodes by causing adjusting of the clock of the first radio node based on the time difference and/or causing transmitting information on the time difference from the first radio node to the second radio node for adjusting the clock of the second radio node.

A computer readable storage medium having a computer program embodied therewith, wherein the computer program executable by a processor to cause the processor to perform a method:
cause performing first receive-side and transmit-side time measurements in a first radio node (e.g., using an apparatus comprising at least elements 217, 202, 203 of FIG. 3A) for obtaining at least one first time delay between a time start pulse of a clock of the first radio node and at least one marker of a transmit-side marker signal of the first radio node and at least one second time delay between the time start pulse of the clock of the first radio node and at least one marker of a receive-side marker signal of the first radio node, wherein the transmit-side marker signal is generated (in the first radio node) by assigning a first value for one or more sections of a transmit-side envelope signal exceeding or falling below a pre-defined transmit-side threshold for defining one or more markers and assigning a different value for other sections of the transmit-side envelope signal and the receive-side marker signal is generated (in the first radio node) by assigning a second value for one or more sections of a receive-side envelope signal exceeding or falling below a pre-defined receive-side threshold for defining one or more markers and assigning a different value for other sections of the receive-side envelope signal, the transmit-side and receive-side envelope signals being generated by taking an envelope of sampled transmit and receive signals of the first radio node;

receive or retrieve information on at least one third time delay between a time start pulse of a clock of the second radio node and at least one marker of a transmit-side marker signal of the second radio node and at least one fourth time delay between the time start pulse of the clock of the second radio node and at least one marker of a receive-side marker signal of the second radio node;

calculate a time difference between the first and second radio nodes based on the at least one first, second, third and fourth time delays; and cause synchronization or correction of existing synchronization between the clocks of the first and second radio nodes by causing adjusting of the clock of the first radio node based on the time difference and/or causing transmitting information on the time difference from the first radio node to the second radio node for adjusting the clock of the second radio node.

A computer program product embodied on a distribution medium readable by a computer and comprising program instructions which, when loaded into an apparatus, execute a method comprising:

cause performing first receive-side and transmit-side time measurements in a first radio node (e.g., using an apparatus comprising at least elements 217, 202, 203 of FIG. 3A) for obtaining at least one first time delay between a time start pulse of a clock of the first radio node and at least one marker of a transmit-side marker signal of the first radio node and at least one second time delay between the time start pulse of the clock of the first radio node and at least one marker of a receive-side marker signal of the first radio node, wherein the transmit-side marker signal is generated by assigning a first value for one or more sections of a transmit-side envelope signal exceeding or falling below a pre-defined transmit-side threshold for defining one or more markers and assigning a different value for other sections of the transmit-side envelope signal and the receive-side marker signal is generated by assigning a second value for one or more sections of a receive-side envelope signal exceeding or falling below a pre-defined receive-side threshold for defining one or more markers and assigning a different value for other sections of the receive-side envelope signal, the transmit-side and receive-side envelope signals being generated by taking an envelope of sampled transmit and receive signals of the first radio node;

receive or retrieve information on at least one third time delay between a time start pulse of a clock of the second radio node and at least one marker of a transmit-side marker signal of the second radio node and at least one fourth time delay between the time start pulse of the clock of the second radio node and at least one marker of a receive-side marker signal of the second radio node;

calculate a time difference between the first and second radio nodes based on the at least one first, second, third and fourth time delays; and cause synchronization or correction of existing synchronization between the clocks of the first and second radio nodes by causing adjusting of the clock of the first radio node based on the time difference and/or causing transmitting information on the time difference from the first radio node to the second radio node for adjusting the clock of the second radio node.

A computer program stored in a computer-readable storage medium, the program comprising software code for performing the steps of:

causing sampling transmit and receive signals of a first radio node to be transmitted to or received from a second radio node;

producing a transmit-side envelope signal based on a sampled transmit signal;

generating, based on the transmit-side envelope signal, a transmit-side marker signal by assigning a first value for one or more sections of the transmit-side envelope signal exceeding or falling below a pre-defined transmit-side threshold for defining one or more markers and assigning a different value for other sections of the transmit-side envelope signal, measuring at least one first time delay between at least one time start pulse of a clock of the first radio node and at least one marker of the transmit-side marker signal and storing to a memory and/or outputting said at least one first time delay;

producing a receive-side envelope signal based on a sampled receive signal;

generating, based on the receive-side envelope signal, a receive-side marker signal by assigning a second value for sections of the receive-side envelope signal exceeding or falling below a pre-defined receive-side threshold value for defining one or more markers and assigning a different value for other sections of the receive-side envelope signal measuring at least one second time delay between the at least one time start pulse and at least one marker of the receive-side marker signal and storing to the memory and/or outputting said at least one second time delay.

A computer readable storage medium having a computer program embodied therewith, wherein the computer program executable by a processor to cause the processor to perform a method:

causing sampling transmit and receive signals of a first radio node to be transmitted to or received from a second radio node;

producing a transmit-side envelope signal based on a sampled transmit signal;

generating, based on the transmit-side envelope signal, a transmit-side marker signal by assigning a first value for one or more sections of the transmit-side envelope signal exceeding or falling below a pre-defined transmit-side threshold for defining one or more markers and assigning a different value for other sections of the transmit-side envelope signal, measuring at least one first time delay between at least one time start pulse of a clock of the first radio node and at least one marker of the transmit-side marker signal and storing to a memory and/or outputting said at least one first time delay;

producing a receive-side envelope signal based on a sampled receive signal;

generating, based on the receive-side envelope signal, a receive-side marker signal by assigning a second value for sections of the receive-side envelope signal exceeding or falling below a pre-defined receive-side threshold value for defining one or more markers and assigning a different value for other sections of the receive-side envelope signal measuring at least one second time delay between the at least one time start pulse and at least one marker of the receive-side marker signal and storing to the memory and/or outputting said at least one second time delay.

A computer program product embodied on a distribution medium readable by a computer and comprising program instructions which, when loaded into an apparatus, execute a method comprising:

causing sampling transmit and receive signals of a first radio node to be transmitted to or received from a second radio node;

producing a transmit-side envelope signal based on a sampled transmit signal;

generating, based on the transmit-side envelope signal, a transmit-side marker signal by assigning a first value for one or more sections of the transmit-side envelope signal exceeding or falling below a pre-defined transmit-side threshold for defining one or more markers and assigning a different value for other sections of the transmit-side envelope signal, measuring at least one first time delay between at least one time start pulse of a clock of the first radio node and at least one marker of the transmit-side marker signal and storing to a memory and/or outputting said at least one first time delay;

producing a receive-side envelope signal based on a sampled receive signal;

generating, based on the receive-side envelope signal, a receive-side marker signal by assigning a second value for sections of the receive-side envelope signal exceeding or falling below a pre-defined receive-side threshold value for defining one or more markers and assigning a different value for other sections of the receive-side envelope signal measuring at least one second time delay between the at least one time start pulse and at least one marker of the receive-side marker signal and storing to the memory and/or outputting said at least one second time delay.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for a first radio node, comprising:
   a sampling circuit configured to sample transmit and receive signals of a first radio node to be transmitted to or received from a second radio node;
   a transmit-side envelope detector configured to produce a transmit-side envelope signal based on a sampled transmit signal;
   a transmit-side time measurement unit configured to:
      generate, based on the transmit-side envelope signal, a transmit-side marker signal by assigning a first value for one or more sections of the transmit-side envelope signal exceeding or falling below a pre-defined transmit-side threshold for defining one or more markers and assigning a different value for other sections of the transmit-side envelope signal;
      measure at least one first time delay between at least one time start pulse of a clock of the first radio node and at least one marker of the transmit-side marker signal; and
      store to a memory and/or output said at least one first time delay;
   a receive-side envelope detector configured to produce a receive-side envelope signal based on a sampled receive signal; and
   a receive-side time measurement unit configured to:
      generate, based on the receive-side envelope signal, a receive-side marker signal by assigning a second value for sections of the receive-side envelope signal exceeding or falling below a pre-defined receive-side threshold value for defining one or more markers and assigning a different value for other sections of the receive-side envelope signal;
      measure at least one second time delay between the at least one time start pulse and at least one marker of the receive-side marker signal; and
      store to the memory and/or output said at least one second time delay.

2. The apparatus of claim 1, wherein the transmit and receive signals are radio frequency signals or intermediate frequency signals.

3. The apparatus according to claim 1, wherein the sampling circuit comprises a directional coupler, a power splitter or a power divider.

4. The apparatus according to claim 1, wherein: the transmit-side measurement unit or the sampling circuit further comprises:
   a transmit-side automatic gain control unit configured to adjust power level of the sampled transmit signal before its fed to the transmit-side envelope detector; and
the receive-side measurement unit or the sampling circuit further comprises:
   a receive-side automatic gain control unit configured to adjust power level of the sampled receive signal before its fed to the receive-side envelope detector.

5. The apparatus according to claim 4, wherein the transmit-side and receive-side automatic gain control units are configured to output equal power levels.

6. The apparatus according to claim 1, wherein:
the transmit-side time measurement unit comprises:
   a transmit-side comparator configured to perform the generation of the transmit-side marker signal;
   a transmit-side D latch configured to receive the transmit-side marker signal as a clock input and a logical one as a D-input and to output a transmit-side Q signal;
   a transmit-side XOR gate configured to receive the time start pulse of the clock of the first radio node and the transmit-side Q signal and to output a transmit-side XOR output signal;
   a transmit-side clock configured to provide a transmit-side clock signal;
   a transmit-side AND gate configured to receive the transmit-side XOR output signal and the transmit-side clock signal and to output a transmit-side AND output signal defining pulses to be counted;

at least one transmit-side pulse counter configured to count pulses in the transmit-side AND output signal and to output a transmit-side counter output signal defining the number of counted pulses; and a transmit-side microcontroller configured to receive the transmit-side counter output, to measure a first time delay based on the number of counted pulses defined in the transmit-side counter output signal and the clock frequency of the transmit-side clock and to output the first time delay; and/or the receive-side time measurement unit comprises:

a receive-side comparator configured to perform the generation of the receive-side marker signal;

a receive-side D latch configured to receive the receive-side marker signal as a clock input and to output a receive-side Q signal;

a receive-side XOR gate configured to receive the time start pulse of the clock of the first radio node and the receive-side Q signal and to output a receive-side XOR output signal;

a receive-side clock configured to provide a receive-side clock signal;

a receive-side AND gate configured to receive the receive-side XOR output signal and the receive-side clock signal and to output a receive-side AND output signal defining pulses to be counted;

at least one receive-side pulse counter configured to count pulses in the receive-side AND output signal and to output a receive-side counter output signal defining the number of counted pulses; and a receive-side microcontroller configured to receive the receive-side counter output and to measure a second time delay based on the number of counted pulses defined in the receive-side counter output signal and the clock frequency of the receive-side clock and to output the second time delay.

7. The apparatus to claim 6, wherein: the transmit-side microcontroller is further configured to reset the transmit-side counter and the transmit-side D latch back to zero after each time measurement; and the receive-side microcontroller is further configured to reset the receive-side counter and the receive-side D latch back to zero after each time measurement.

8. The apparatus to claim 1, wherein:

the transmit-side time measurement unit comprises:

a transmit-side comparator configured to perform the generation of the transmit-side marker signal; and one or more transmit-side time-to-digital converters configured to perform the measuring of said at least one first time delay; and/or the receive-side time measurement unit comprises:

a receive-side comparator configured to perform the generation of the receive-side marker signal; and one or more receive-side time-to-digital converters configured to perform the measuring of said at least one second time delay.

9. The apparatus according to claim 6, wherein the transmit-side time measurement unit comprises:

a transmit-side voltage division circuit with a transmit-side adjustable resistor or a transmit-side adjustable voltage source configured to provide a controllable voltage to the transmit-side comparator so as to implement a pre-defined transmit-side threshold value; and wherein the receive-side time measurement unit comprises a receive-side voltage division circuit with a receive-side adjustable resistor or a receive-side adjustable voltage source configured to provide a controllable voltage to the receive-side comparator so as to implement a pre-defined receive-side threshold value.

10. The apparatus according to claim 1, wherein the transmit-side time measurement unit is configured to generate the transmit-side marker signal so as to cover a marker measurement time period and/or the receive-side time measurement unit is configured to generate the transmit-side marker signal so as to cover the marker measurement time period, the marker measurement time period being smaller than or equal to a period of time start pulses generated by the clock of the first radio node.

11. A first radio node, comprising:

the apparatus according to claim 1;

a clock configured to generate time start pulses; and a computing device, comprising:

at least one processor; and at least one second memory storing instructions to be executed by the processor, wherein the at least one second memory and the instructions are configured to, with the at least one processor, cause the computing device at least to:

perform first receive-side and transmit-side time measurements in the first radio node for obtaining the at least one first time delay between a time start pulse of the clock of the first radio node and at least one marker of a transmit-side marker signal of the first radio node and at least one second time delay between the time start pulse of the clock of the first radio node and at least one marker of a receive-side marker signal of the first radio node, wherein the transmit-side marker signal is generated by assigning a first value for one or more sections of a transmit-side envelope signal exceeding or falling below a pre-defined transmit-side threshold for defining one or more markers and assigning a different value for other sections of the transmit-side envelope signal and the receive-side marker signal is generated by assigning a second value for one or more sections of a receive-side envelope signal exceeding or falling below a pre-defined receive-side threshold for defining one or more markers and assigning a different value for other sections of the receive-side envelope signal, the transmit-side and receive-side envelope signals being generated by taking an envelope of sampled transmit and receive signals of the first radio node;

receive or retrieve information on at least one third time delay between a time start pulse of the clock of the second radio node and at least one marker of a transmit-side marker signal of the second radio node and at least one fourth time delay between the time start pulse of the clock of the second radio node and at least one marker of a receive-side marker signal of the second radio node;

calculate a time difference between the first and second radio nodes based on the at least one first, second, third and fourth time delays; and synchronize or correct existing synchronization between the clocks of the first and second radio nodes by adjusting of the clock of the first radio node based on the time difference and/or transmitting information on the time difference from the first radio node to the second radio node for adjusting the clock of the second radio node.

12. A computing device for a first radio node, said computing device comprising:
at least one processor; and
at least one memory storing instructions to be executed by the processor, wherein the at least one memory and the instructions are configured to, with the at least one processor, cause the computing device at least to:
perform first receive-side and transmit-side time measurements in the first radio node for obtaining at least one first time delay between a time start pulse of a clock of the first radio node and at least one marker of a transmit-side marker signal of the first radio node and at least one second time delay between the time start pulse of the clock of the first radio node and at least one marker of a receive-side marker signal of the first radio node, wherein the transmit-side marker signal is generated by assigning a first value for one or more sections of a transmit-side envelope signal exceeding or falling below a pre-defined transmit-side threshold for defining one or more markers and assigning a different value for other sections of the transmit-side envelope signal and the receive-side marker signal is generated by assigning a second value for one or more sections of a receive-side envelope signal exceeding or falling below a pre-defined receive-side threshold for defining one or more markers and assigning a different value for other sections of the receive-side envelope signal, the transmit-side and receive-side envelope signals being generated by taking an envelope of sampled transmit and receive signals of the first radio node;
receive or retrieve information on at least one third time delay between a time start pulse of a clock of the second radio node and at least one marker of a transmit-side marker signal of the second radio node and at least one fourth time delay between the time start pulse of the clock of the second radio node and at least one marker of a receive-side marker signal of the second radio node;
calculate a time difference between the first and second radio nodes based on the at least one first, second, third and fourth time delays; and
synchronize or correct existing synchronization between the clocks of the first and second radio nodes by adjusting of the clock of the first radio node based on the time difference and/or transmitting information on the time difference from the first radio node to the second radio node for adjusting the clock of the second radio node.

13. The computing device of claim 12, wherein the at least one memory and the instructions are configured to, with the at least one processor, cause the computing device to cause an apparatus comprised in said first radio node to perform said first receive-side and transmit-side time measurements, wherein said apparatus comprises:
a sampling circuit configured to sample transmit and receive signals of the first radio node to be transmitted to or received from the second radio node;
a transmit-side envelope detector configured to produce a transmit-side envelope signal based on a sampled transmit signal;
a transmit-side time measurement unit configured to generate, based on the transmit-side envelope signal, a transmit-side marker signal by assigning a first value for one or more sections of the transmit-side envelope signal exceeding or falling below a pre-defined transmit-side threshold for defining one or more markers and assigning a different value for other sections of the transmit-side envelope signal;
measure at least one first time delay between at least one time start pulse of a clock of the first radio node and at least one marker of the transmit-side marker signal; and
store to the at least one memory and/or output said at least one first time delay;
a receive-side envelope detector configured to produce a receive-side envelope signal based on a sampled receive signal; and
a receive-side time measurement unit configured to
generate, based on the receive-side envelope signal, a receive-side marker signal by assigning a second value for sections of the receive-side envelope signal exceeding or falling below a pre-defined receive-side threshold value for defining one or more markers and assigning a different value for other sections of the receive-side envelope signal;
measure at least one second time delay between the at least one time start pulse and at least one marker of the receive-side marker signal; and
store to the at least one memory and/or output said at least one second time delay.

14. The computing device of claim 12, wherein the at least one memory and the instructions are configured to, with the at least one processor, cause the computing device to perform the calculating of the time difference according to the equation $$\Delta t = \pm[(t_2-t_3)-(t_4-t_1)]/2,$$

wherein $\Delta t$ is the time difference, $\pm$ corresponds to different sign conventions, and $t_1$, $t_2$, $t_3$ and $t_4$ are, respectively, the first, second, third and fourth time delays.

15. The computing device according to claim 12, wherein the at least one first time delay comprises a plurality of first time delays, the at least one second time delay comprises a plurality of second time delays, the at least one third time delay comprises a plurality of third time delays and the at least one fourth time delay comprises a plurality of fourth time delays, the at least one memory and the instructions being configured to, with the at least one processor, cause the computing device to perform the calculating of the time difference by:
calculating a plurality of values of time difference based on a plurality of sets of first, second, third and fourth time delays; and
calculating the time difference based on the plurality of values of time difference.

16. The computing device of claim 15, wherein the calculating of the time difference based on the plurality of values of time difference comprises calculating the time difference as a mode of a discretized set of values of the time difference derived from the plurality of values of the time difference.

17. The computing device according to claim 12, wherein the at least one memory and the instructions are configured to, with the at least one processor, cause the computing device to perform, before the causing of the performing of the first receive-side and transmit-side time measurements:
calculating a first threshold for a normalized amplitude of an envelope signal based on a probability distribution of the amplitude of the envelope signal and a marker measurement time period configured to the apparatus;

calculating a second threshold for the amplitude of the envelope signal based on an average of a measured amplitude of the envelope signal and the first threshold; and causing configuring of at least one of:
the transmit-side time measurement unit of the apparatus to use said second threshold as a pre-defined transmit-side threshold value; or
the receive-side time measurement unit of the apparatus to use said second threshold as a pre-defined receive-side threshold value.

18. The computing device according to claim 17, wherein the at least one memory and the instructions are configured to, with the at least one processor, cause the computing device to perform the calculating of the first threshold by:
calculating a probability P that the amplitude of the envelope signal exceeds or falls below the first threshold according to $$P = 1/(2 \times T_{meas} \times BW_{mod}),$$

wherein $T_{meas}$ is the marker measurement time period assumed to be equal to an average marker measurement time period and $BW_{mod}$ is a bandwidth of radio frequency modulation used in the first radio node; and
determining a non-normalized first threshold based on the probability value and the probability distribution of the amplitude of the envelope signal; and
determining the first threshold based on the non-normalized first threshold and an average of the amplitude of the envelope signal in the probability distribution.

19. A method, comprising:
performing, in a first radio node, first receive-side and transmit-side time measurements for obtaining at least one first time delay between a time start pulse of a clock of the first radio node and at least one marker of a transmit-side marker signal of the first radio node and at least one second time delay between the time start pulse of the clock of the first radio node and at least one marker of a receive-side marker signal of the first radio node, wherein the transmit-side marker signal is generated by assigning a first value for one or more sections of a transmit-side envelope signal exceeding or falling below a pre-defined transmit-side threshold for defining one or more markers and assigning a different value for other sections of the transmit-side envelope signal and the receive-side marker signal is generated by assigning a second value for one or more sections of a receive-side envelope signal exceeding or falling below a pre-defined receive-side threshold for defining one or more markers and assigning a different value for other sections of the receive-side envelope signal, the transmit-side and receive-side envelope signals being generated by taking an envelope of sampled transmit and receive signals of the first radio node;
receiving or retrieving, by the first radio node from a second radio node, information on at least one third time delay between a time start pulse of a clock of the second radio node and at least one marker of a transmit-side marker signal of the second radio node and at least one fourth time delay between the time start pulse of the clock of the second radio node and at least one marker of a receive-side marker signal of the second radio node;
calculating, by the first radio node, a time difference between the first and second radio nodes based on the at least one first, second, third and fourth time delays; and
synchronizing or correcting, by the first radio node, an existing synchronization between the clocks of the first and second radio nodes by adjusting of the clock of the first radio node based on the time difference and/or transmitting information on the time difference from the first radio node to the second radio node for adjusting the clock of the second radio node.

20. A method comprising:
sampling transmit and receive signals of a first radio node to be transmitted to or received from a second radio node;
producing a transmit-side envelope signal based on a sampled transmit signal;
generating, based on the transmit-side envelope signal, a transmit-side marker signal by assigning a first value for one or more sections of the transmit-side envelope signal exceeding or falling below a pre-defined transmit-side threshold for defining one or more markers and assigning a different value for other sections of the transmit-side envelope signal;
measuring at least one first time delay between at least one time start pulse of a clock of the first radio node and at least one marker of the transmit-side marker signal;
storing to a memory and/or outputting said at least one first time delay;
producing a receive-side envelope signal based on a sampled receive signal;
generating, based on the receive-side envelope signal, a receive-side marker signal by assigning a second value for sections of the receive-side envelope signal exceeding or falling below a pre-defined receive-side threshold value for defining one or more markers and assigning a different value for other sections of the receive-side envelope signal;
measuring at least one second time delay between the at least one time start pulse of the clock of the first radio node and at least one marker of the receive-side marker signal; and
storing to the memory and/or outputting said at least one second time delay.

21. A non-transitory computer readable medium comprising program instructions that, when executed by an apparatus, cause the apparatus to at least:
perform first receive-side and transmit-side time measurements in a first radio node for obtaining at least one first time delay between a time start pulse of a clock of the first radio node and at least one marker of a transmit-side marker signal of the first radio node and at least one second time delay between the time start pulse of the clock of the first radio node and at least one marker of a receive-side marker signal of the first radio node, wherein the transmit-side marker signal is generated by assigning a first value for one or more sections of a transmit-side envelope signal exceeding or falling below a pre-defined transmit-side threshold for defining one or more markers and assigning a different value for other sections of the transmit-side envelope signal and the receive-side marker signal is generated by assigning a second value for one or more sections of a receive-side envelope signal exceeding or falling below a pre-defined receive-side threshold for defining one or more markers and assigning a different value for other sections of the receive-side envelope signal, the transmit-side and receive-side envelope signals being generated by taking an envelope of sampled transmit and receive signals of the first radio node;

receive or retrieve information on at least one third time delay between a time start pulse of a clock of the second radio node and at least one marker of a transmit-side marker signal of the second radio node and at least one fourth time delay between the time start pulse of the clock of the second radio node and at least one marker of a receive-side marker signal of the second radio node;

calculate a time difference between the first and second radio nodes based on the at least one first, second, third and fourth time delays; and synchronize or correct existing synchronization between the clocks of the first and second radio nodes by adjusting of the clock of the first radio node based on the time difference and/or transmitting information on the time difference from the first radio node to the second radio node for adjusting the clock of the second radio node.

22. A non-transitory computer readable medium comprising program instructions that, when executed by an apparatus, cause the apparatus to perform at least a method comprising:

transmitting or receiving sampling transmit and receive signals of a first radio node to or from a second radio node;

producing a transmit-side envelope signal based on a sampled transmit signal;

generating, based on the transmit-side envelope signal, a transmit-side marker signal by assigning a first value for one or more sections of the transmit-side envelope signal exceeding or falling below a pre-defined transmit-side threshold for defining one or more markers and assigning a different value for other sections of the transmit-side envelope signal;

measuring at least one first time delay between at least one time start pulse of a clock of the first radio node and at least one marker of the transmit-side marker signal;

storing to a memory and/or outputting said at least one first time delay;

producing a receive-side envelope signal based on a sampled receive signal;

generating, based on the receive-side envelope signal, a receive-side marker signal by assigning a second value for sections of the receive-side envelope signal exceeding or falling below a pre-defined receive-side threshold value for defining one or more markers and assigning a different value for other sections of the receive-side envelope signal;

measuring at least one second time delay between the at least one time start pulse of the clock of the first radio node and at least one marker of the receive-side marker signal; and storing to the memory and/or outputting said at least one second time delay.

* * * * *